US008847972B2

(12) United States Patent  
Kane et al.

(10) Patent No.: US 8,847,972 B2
(45) Date of Patent: Sep. 30, 2014

(54) ADAPTING DISPLAY COLOR FOR LOW LUMINANCE CONDITIONS

(75) Inventors: Paul J. Kane, Rochester, NY (US); Andrew F. Kurtz, Macedon, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 1053 days.

(21) Appl. No.: 12/690,150

(22) Filed: Jan. 20, 2010

(65) Prior Publication Data

US 2011/0175925 A1   Jul. 21, 2011

(51) Int. Cl.
| | | |
|---|---|---|
| G09G 5/02 | (2006.01) | |
| G01J 1/42 | (2006.01) | |
| H04N 9/31 | (2006.01) | |
| H04N 21/431 | (2011.01) | |
| H04N 5/58 | (2006.01) | |
| H04N 21/422 | (2011.01) | |
| G09G 5/10 | (2006.01) | |

(52) U.S. Cl.
CPC ........... *G01J 1/42* (2013.01); *G09G 2320/0666* (2013.01); *G01J 1/4204* (2013.01); *G09G 5/10* (2013.01); *G09G 2320/0626* (2013.01); *H04N 9/3182* (2013.01); *G09G 2360/144* (2013.01); *H04N 21/4318* (2013.01); *H04N 5/58* (2013.01); *H04N 21/42202* (2013.01); *G09G 2340/06* (2013.01); *G09G 5/02* (2013.01)
USPC ............................ 345/589; 348/687; 382/167

(58) Field of Classification Search
CPC ......... H04N 5/57; H04N 5/58; H04N 9/3182; G09G 2320/06; G09G 2320/0646; G09G 2320/0626; G09G 2320/0666
USPC .......... 345/581, 589, 600, 604; 348/687, 744; 382/167, 274
See application file for complete search history.

(56) References Cited

U.S. PATENT DOCUMENTS

| | | |
|---|---|---|
| 5,754,682 A | 5/1998 | Katoh |
| 6,411,306 B1 | 6/2002 | Miller et al. |
| 6,529,212 B2 | 3/2003 | Miller et al. |
| 6,975,776 B2 | 12/2005 | Ferguson |
| 7,142,218 B2 | 11/2006 | Yoshida et al. |
| 7,499,163 B2 | 3/2009 | Lianza et al. |
| 2002/0015043 A1 | 2/2002 | Matsuda |
| 2002/0024529 A1* | 2/2002 | Miller et al. .................. 345/690 |
| 2005/0024538 A1 | 2/2005 | Park et al. |
| 2006/0007223 A1 | 1/2006 | Parker |
| 2007/0063961 A1 | 3/2007 | Kuroki |

(Continued)

OTHER PUBLICATIONS

CIE Activity Report for Division 1, Vision of Color of Jan. 2008, pp. 25-26, Extensions of CIECAM02.
J.C. Shin et al.; Change of Color Appearance in Photopic, Mesopic, and Scotopic Vision; Optical Reivew, vol. 11, 2204, pp. 265-271.

(Continued)

*Primary Examiner* — Xiao Wu
*Assistant Examiner* — Scott E Sonners

(57) ABSTRACT

A method for adapting color appearance of a display (200) for low luminance conditions includes operating a projection (100) to display images on a display surface (30); detecting ambient light conditions and displayed image brightness; determining low luminance conditions based on the detected ambient light conditions and the detected display brightness; determining changes in color appearance to be applied to the displayed images based on the low luminance conditions, a model of photopic vision of the human eye, and a model of mesopic vision of the human eye; and applying the determined changes in the color appearance to image data using an image processor (130) that alters the image data for the projected images.

43 Claims, 8 Drawing Sheets

(56) References Cited

U.S. PATENT DOCUMENTS

| | | |
|---|---|---|
| 2007/0296867 A1 | 12/2007 | Park |
| 2008/0238931 A1 | 10/2008 | Komiya et al. |
| 2009/0201309 A1* | 8/2009 | Demos .................. 345/589 |
| 2010/0046834 A1* | 2/2010 | Ohga ..................... 382/167 |
| 2011/0050663 A1* | 3/2011 | Katahira ................ 345/207 |
| 2011/0096098 A1* | 4/2011 | Haim et al. ............ 345/690 |

OTHER PUBLICATIONS

J.C. Shin et al.; A Color Appearance Model Applicable in Mesopic Vision; Optical Review, vol. 11, 2004, pp. 272-278.

Giorgianni and Madden; Digital Color Management: Encoding Solutions; Addison-Wesley, 1998, Figure 4.3 and pp. 56 and 58.

R.W.G. Hunt; Measuring Color, 3rd Edition, Fountain Press, 1998, Chapter 12, pp. 208-247.

\* cited by examiner

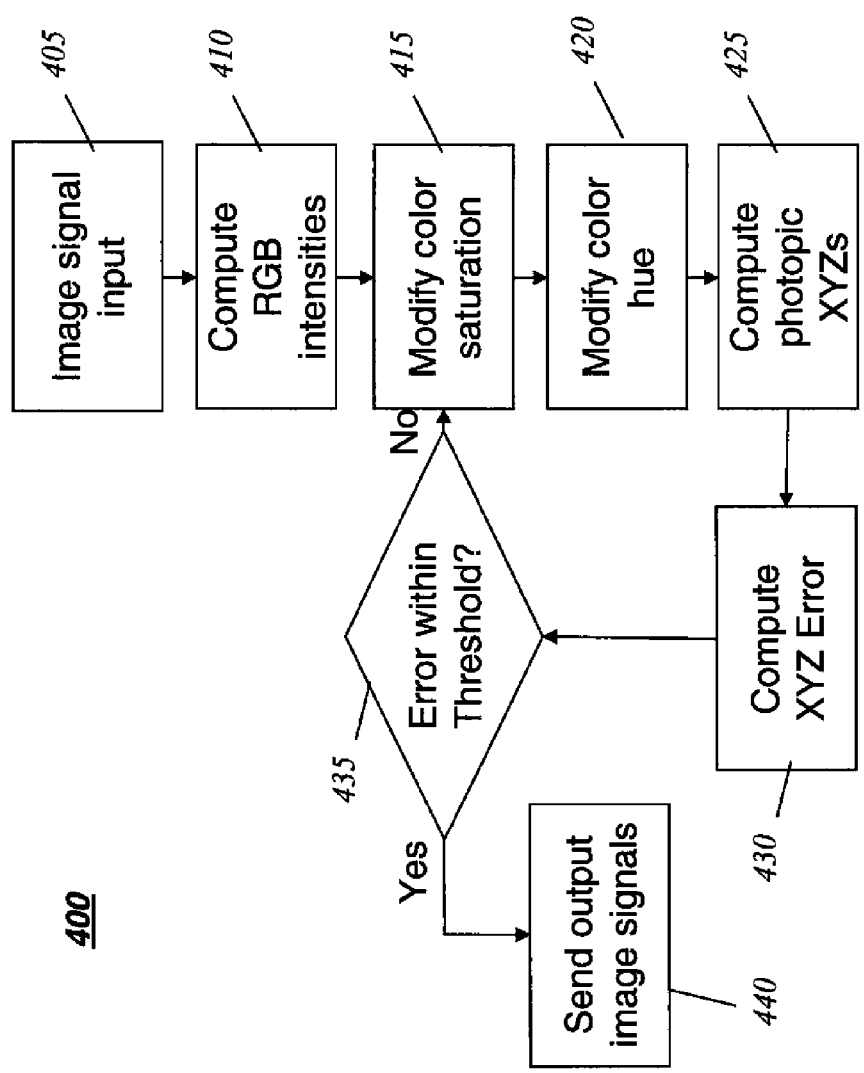
Fig. 6 - Prior Art Method for adapting a display

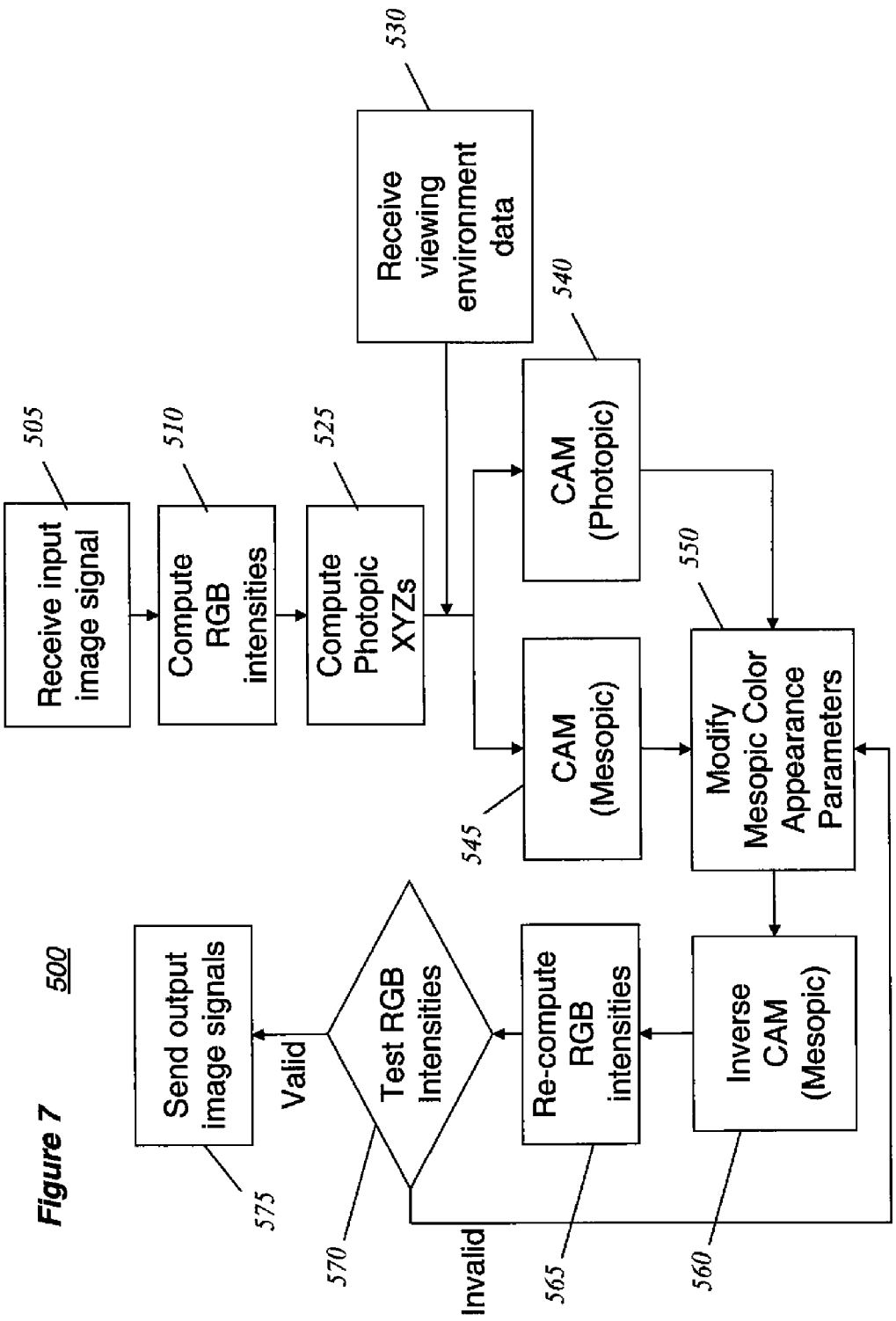

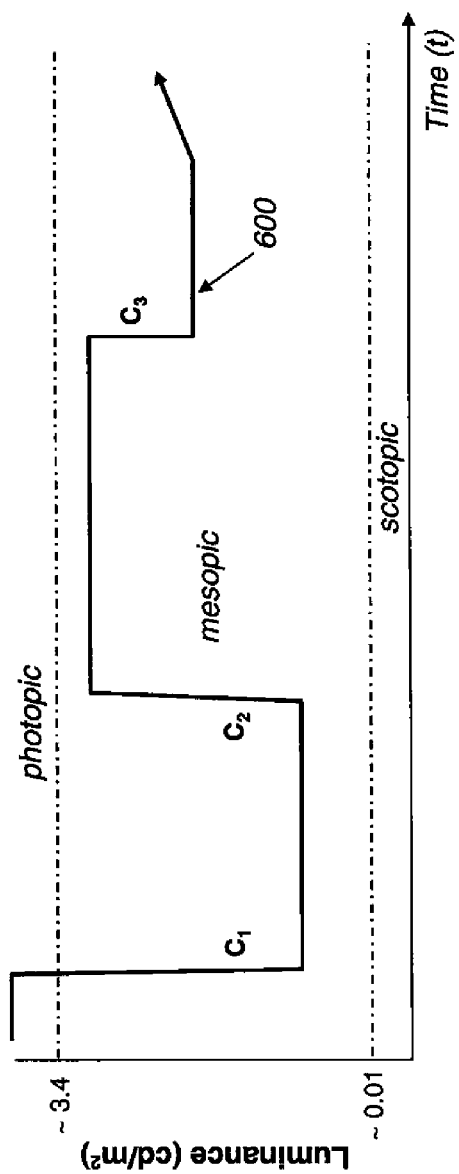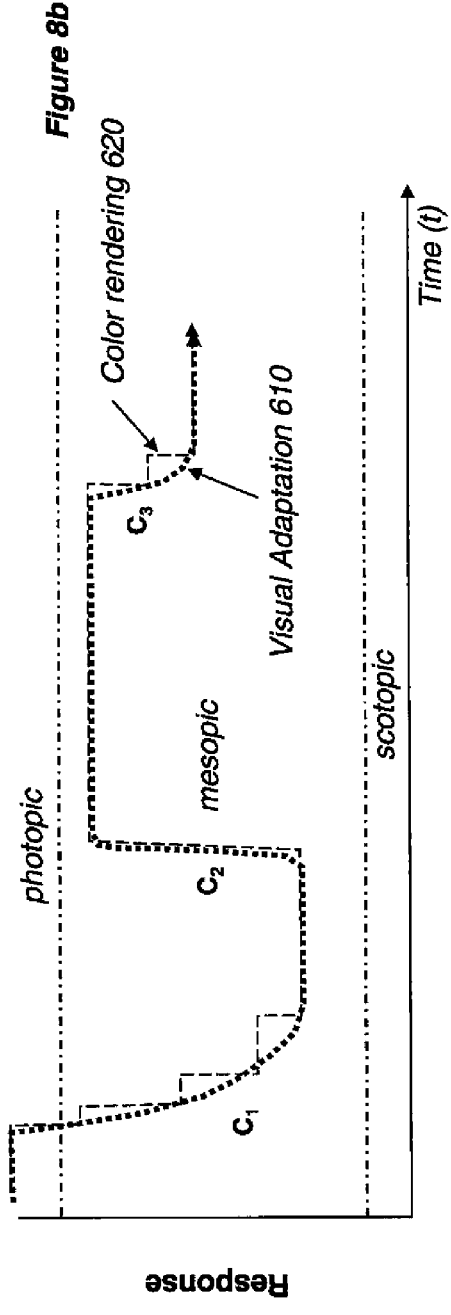

ADAPTING DISPLAY COLOR FOR LOW LUMINANCE CONDITIONS

FIELD OF THE INVENTION

The present invention relates in general to adapting a color display for low luminance viewing conditions.

BACKGROUND OF THE INVENTION

When attending movies, people are accustomed to viewing relatively bright images within darkened theatres. By comparison, business projectors often provide modest luminance images on screens in dimmed conference rooms, such that image contrast is effectively low. As projection technologies evolve, and their uses expand, the range of different viewing experiences will expand as well. In particular, pico-projectors, micro-projectors, and other portable projectors, may be used in a variety of circumstances where the image size, screen luminance, and ambient viewing conditions are mutable. In such instances, the output flux is rather limited, and the brightness (or luminance, in ft·L or $cd/m^2$) can change dramatically with screen distance (image size), and spans the entire range of visual adaptation, from the photopic range, through the mesopic range, and into the scotopic range. These are the three major ranges of visual adaptation, reflecting changes in the overall brightness sensitivity of the human visual system, as currently understood.

It is also understood that the human visual system adapts to changes in the overall color of illumination to preserve color constancy, which refers to the fact that color stimuli tend to retain their color appearance under a change of illuminant. Thus, for example, a page of white paper is perceived as white, whether viewed under daylight or tungsten (blue deficient) illumination conditions. However, this chromatic adaptation, while significant, is approximate. As a result, color perception by the viewers can then change too, as both brightness adaptation and chromatic adaptation occur during the course of changing illumination conditions.

As a baseline, cinematic projection is specified to provide 16 ft·L (foot-Lamberts) or 55 $cd/m^2$ (candles per $m^2$) of peak luminance, which is at the low end of the photopic range. Photopic vision is commonly defined as the vision of the eye that occurs under well-lit conditions (luminance levels of ~3.5 to 106 $cd/m^2$). When projected, image content causes light modulation that can change luminance values so that they fall into the mesopic range. The mesopic visual range is generally accepted to occur when visual stimuli have luminances less than several $cd/m^2$, but greater than several hundredths of a $cd/m^2$ (for example, 0.01 $cd/m^2$ to 3.5 $cd/m^2$). As the typical movie reduces the average screen luminance by ~10×, to ~1.6 ft·L, the apparent screen brightness is typically at the high end of the mesopic range. However, luminance levels can drop further, into the scotopic range, with dark image content and/or underlit projectors. Luminances below the mesopic range are said to fall into the scotopic range of adaptation. Although cinematic projection rarely stays in the scotopic range long enough for the viewers eyes to become night vision adapted, vision adaptation among audience members for mesopic viewing is common. However, in the case of cinema, the cinematographer subjectively corrects for this eye adaptation by viewing the content in a screening room (a dark environment, but smaller than a theatre), and then makes decisions on lighting and other production factors, to get the desired look, including color appearance. In the traditional film system, these decisions are carried forward, in illuminant adjustments within color printers when release prints are made at film laboratories, such as Technicolor®.

Similarly, the colorist in a telecine suite adjusts the illumination, or the electronic color settings (gain, LUT, etc.), to optimize the film to video transfer for television viewing. In that case, the goal is to provide a color viewing experience on a television, which holds close to the cinematographer's original intent for theatre viewing. However, the colorist works in an environment with a brighter ambient lighting than a screening room or theatre, that is generally equivalent to in-home lighting levels. The colorist also works with displays that have a brighter screen luminance than theatres (televisions are specified to provide 120 $cd/m^2$ or 35 ft·L peak luminance), but that provide less image contrast and a diminished color gamut. Similar methods are used in optimizing direct digital "Hollywood" type content.

The fact that cinematographers and colorists make such efforts to color compensate for the differences in viewing conditions, including the changing visual color response to light level, is indicative that these changes are significant. Although the cinematographer and colorist recognize that the content is often viewed in sub-prime conditions, they have optimized the content for the standardized viewing conditions they wish were present.

Outside of the cinematic environment, or the standardized television environment, viewing conditions and perceptual differences vary dramatically. As one example, companies such as Microvision (Redmond, Wash.) are introducing low lumen pico-projectors, which can project in-focus images of different sizes, depending on the projector to screen distance. For example, a 10 lumen pico projector can provide a bright image (16 ft. L or 55 $cd/m^2$) over a small image area (<1 $ft^2$). If this image is modulated down by content, it would remain in the photopic zone for the first 20:1 modulation, and slip into a mesopic range below that. This case would be similar to cinema projection on a small scale. However, as such a projector is inherently portable, it can readily be used to project onto a large area, albeit to provide a dim image. For example, a 10 lumen projector illuminating a large area (10 $ft^2$) would start projection with a peak luminance of ~1 ft·L or ~3.4 $cd/m^2$, which corresponds to a common definition of the photopic/mesopic transition point. As mesopic vision has a ~300-350:1 dynamic range, often defined from 0.011-3.4 $cd/m^2$, image content modulation can easily extend deep into the mesopic visual range, or below it, into the scotopic range. In such cases, the ambient lighting conditions should be reduced if possible, to provide better viewing conditions, which can drop overall viewing conditions into the mesopic range or lower. In such instances, the viewers will experience significant brightness adaptation, and their color perception will also change. It would be useful to then modify the color projection properties provided by the projector, to compensate for the change in color perception with associated with brightness adaptation to low or varying luminance levels, and thus to provide a more consistent color viewing experience.

The prior art contains examples of altering images, whether hardcopy or electronically provided, for variable viewing conditions. As one example, U.S. Pat. No. 5,754,682 (Katoh) describes a picture processing apparatus in which output images can be produced such that a soft copy (electronic) image can coincide in appearance with a hard copy image, while taking into account both the ambient and electronic display brightness. In this case, no attempt is made to improve the images or to account for lack of colorfulness in both images, since the primary goal is to match the appearance of the hardcopy and softcopy images to the observer.

Additionally, the luminance levels of interest are in excess of 100 cd/m², and color appearance correction for mesopic viewing is not anticipated.

As another example, commonly assigned U.S. Pat. Nos. 6,411,306 and 6,529,212 (both by Miller et al.), describe an apparatus for automatically controlling the output luminance and image contrast provided by a display device, when taking into account eye adaptation. The apparatus has sensors to measure both the ambient illumination of the viewing environment and the output luminance of the display device. The resulting data is provided to a computer that produces a compensating signal that continually adjusts the luminance and contrast of the displayed image so as to prevent changes in the brightness and contrast of the image as perceived by the viewer under different ambient conditions. The computer also takes into account the viewing conditions, relative to potential adaptation in the eyes of the viewers. As visual sensitivity increases with eye adaptation, the apparatus can prevent changes in the perceived brightness and contrast of the images, by modifying screen brightness (luminance) and image contrast in a manner that compensates for the eye adaptation changes. However, these patents do not describe how to adjust the display or improve the image for very dim display luminances. In particular these patents do not provide color image correction for viewers experiencing mesopic viewing conditions, for whom perceived color hues are not constant and color saturation is especially weak.

Prior art U.S. Pat. No. 7,142,218 (Yoshida et al.), describes a display device equipped with sensors to determine the spectral composition of the ambient light with respect to chromaticity coordinates. The displayed images are altered using a process that converts an input chrominance signal to a different output chrominance signal, based on the characteristics of the external ambient illumination. Additionally, the target color chrominance signals on the display can be adjusted to provide images that are corrected for human chromatic adaptation characteristics. In particular, this method is primarily concerned with compensating displayed images for changes in how the human visual system adapts color vision in response to changes in the spectral content of the ambient illumination. However, Yoshida does not provide guidance for adjusting displayed image content appropriately to compensate for the changing response of human vision, when the absolute level of luminance decreases into the mesopic range.

As another example, prior art U.S. Pat. No. 7,499,163 (Lianza et al.) describes a system for implementing an appearance model correction for a display, which includes means for measuring an ambient illuminance associated with a display, means for calculating a display correction based in part on the measured ambient illuminance using a polynomial-based algorithm, and means for implementing the calculated correction on the display. The polynomial-based correction is an empirical fit to the more complex CIECAM02 color appearance model that has been certified by the CIE (Commission Internationale de L'Eclairage). Although the empirical fit provided by Lianza et al., extends to low photopic luminance levels, it does not include luminance levels below 3 cd/m² (see Table 1 of Lianza et al.). In addition, according to the CIE Activity Report for Division 1, Vision and Color of January 2008 (page 26, Extensions of CIECAM02), research work is just beginning to address the issue of extending the CIECAM02 model into the mesopic region of vision. Therefore the adjustment method of Lianza et al. cannot adequately address the situation of very low display luminances.

Finally, prior art U.S. Pat. No. 6,975,776 (Ferguson) provides a method for predicting variations in human perception under different luminance conditions, and then using perceptual difference calculations with respect to a reference visual model, to thereby determine corrective spatio-temporal filters that can be applied to video signals. While Ferguson provides compensating approaches for dark adaptation (night vision) relative to pupil size or photon noise, contrast, and correlation, image corrective methods for color attributes for viewers under low luminance or mesopic conditions are not addressed or anticipated.

Thus, as projectors and other displays become increasingly portable, and more likely to display images under low luminance conditions, visual perception of the displayed content will suffer. In particular, all aspects of color perception, related to luminance, saturation, and hue, are altered in the mesopic range. Therefore, it is desirable to enhance image display to viewers, relative to color perception, during the course of image display under mesopic viewing conditions.

SUMMARY OF THE INVENTION

Briefly, according to one aspect of the present invention a method for adapting color appearance of a display for low luminance conditions includes operating a projector to display images on a display surface; detecting ambient light conditions and displayed image brightness; determining low luminance conditions based on the detected ambient light conditions and the detected display brightness; determining changes in color appearance to be applied to the displayed images based on the low luminance conditions, a model of photopic vision of the human eye, and a model of mesopic vision of the human eye; and applying the determined changes in the color appearance to image data using an image processor that alters the image data for the projected images.

The invention and its objects and advantages will become more apparent in the detailed description of the preferred embodiment presented below.

BRIEF DESCRIPTION OF THE DRAWINGS

The present invention will be more readily understood from the detailed description of exemplary embodiments presented below considered in conjunction with the attached drawings, of which:

FIG. 6 illustrates a prior art method for color correcting a display;

FIG. 7 illustrates the method of the present invention for color correcting a display, particularly for low luminance viewing conditions; and FIGS. 8a and 8b, in combination, illustrate the application of the method of the present invention, in time, relative to changes in luminance level and visual adaptation.

DETAILED DESCRIPTION OF THE INVENTION

Figure 1:
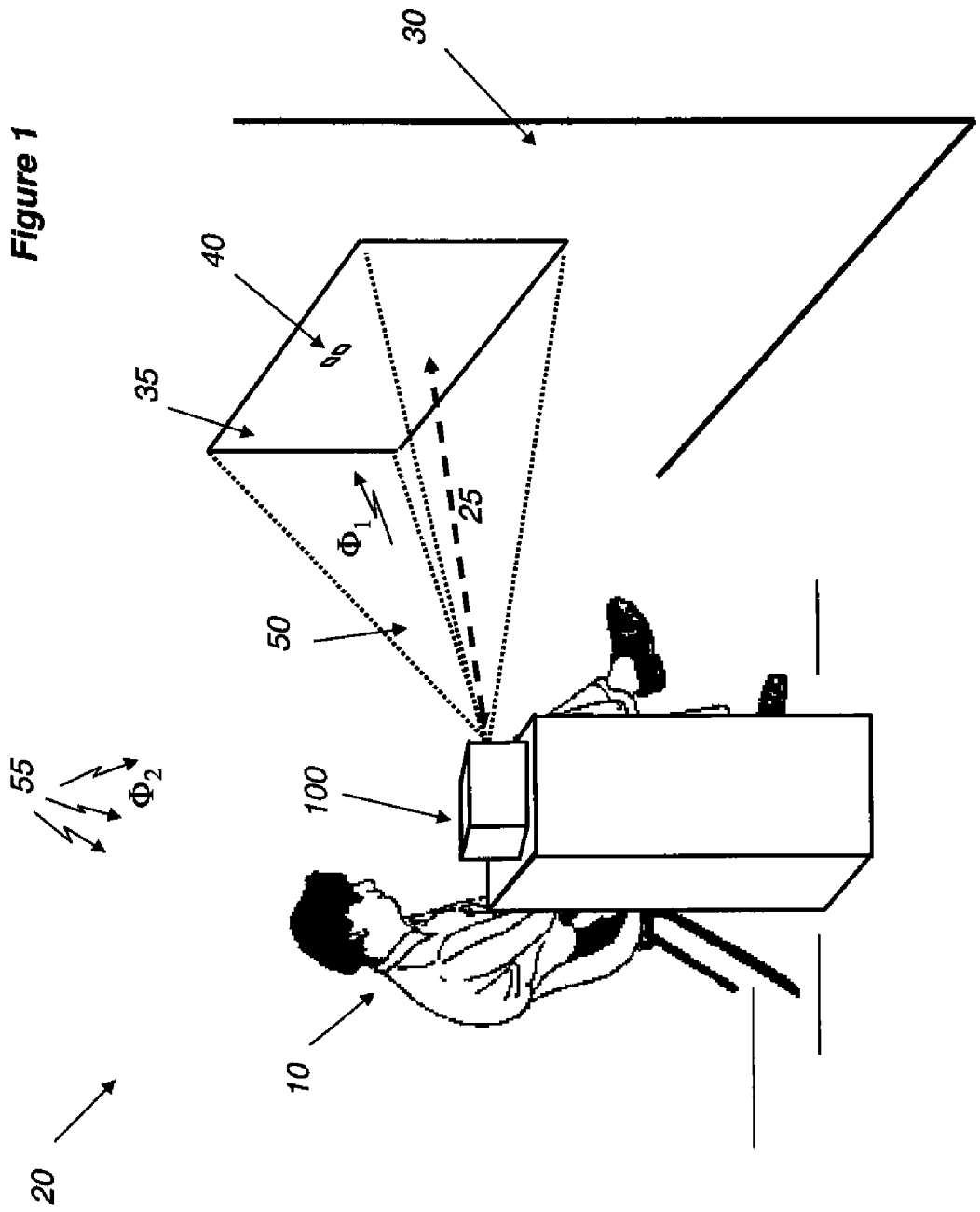
FIG. 1 illustrates the display (projector) of the present invention being operated by a user.

Referring now to FIG. 1, a representative situation is shown, in which a user 10, present within a local environment 20, and is viewing images provided by a projector 100. The projected images are formed at a distance or throw 25, from projector 100 to display surface 30, so that image light ($\Phi_1$) from the projector 100 transits a field of view 50 to illuminate an image area 35. Ambient light 55 (or $\Phi_2$), which can be natural lighting, artificial lighting, or combinations thereof, can illuminate the environment 20, and particularly the local area proximate to the user 10, projector 100, and image area 35.

Figure 2:
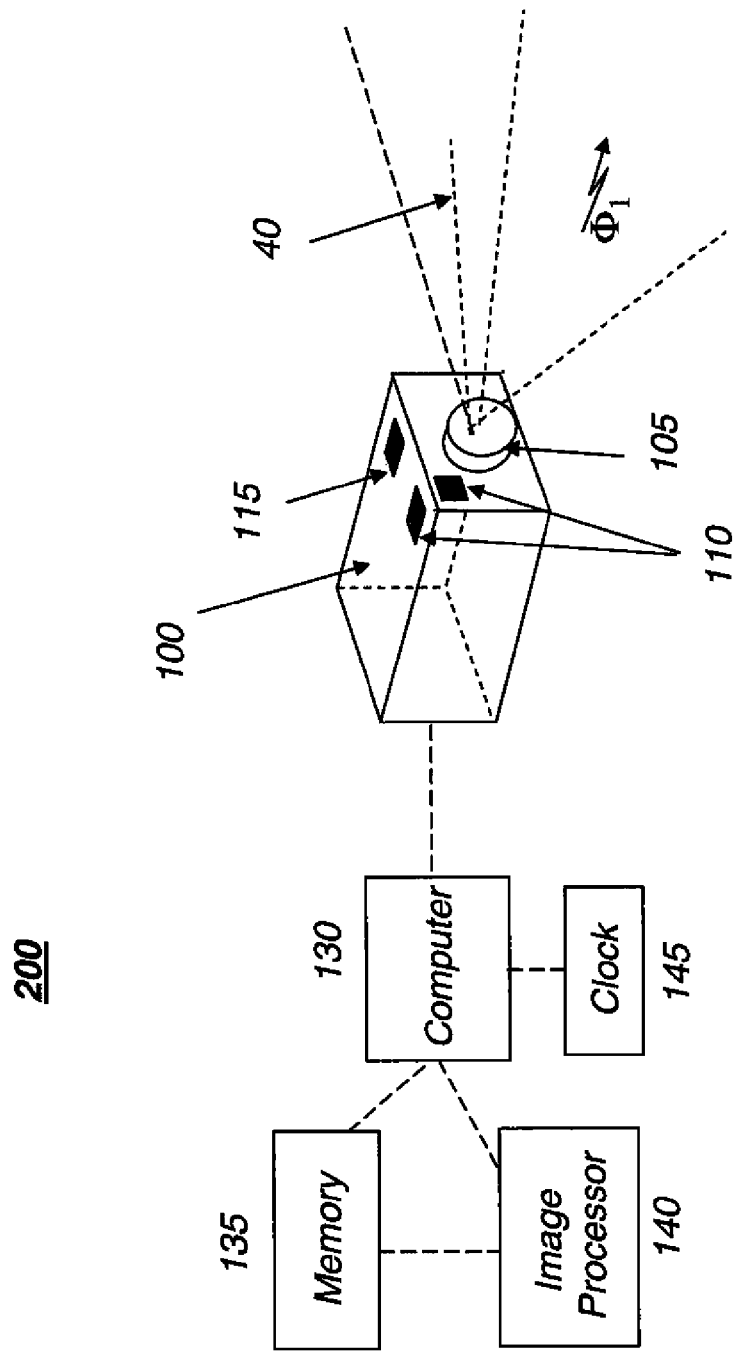
FIG. 2 illustrates the projector and its constituent parts.

As further shown in FIG. 2, projector 100 is part of a display system 200, which further includes a computer 130, a memory 135, and an image processor 140. The computer 130, a memory 135, and an image processor 140 can reside within projector 100, or be provided externally, or combinations thereof. Computer 130, memory 135, and image processor 140 have the function of providing still or video images to projector 100 for projection to display surface 30. Thus, image processor 140 can also include a video processor to support streaming of real time video imagery. Memory 135 includes active memory devices, such as RAM, hard drives, or flash drives, and well as memory storage media such as DVDs. It should also be understood that image processor 140, in cooperation with computer 130 and memory 135, executes the specialized software programs or algorithms of the present invention that first determine appropriate image alterations and then apply them to the input video data, prior to projection. Projector 100 also includes one or more light sensors 110, as well as secondary sensors 115. Light sensors 110 are used to detect the level or intensity of ambient visible light ($\Phi_2$). They can also be used to detect magnitudes of image light ($\Phi_1$) present in the image area 30, and the spectral or color content of either the ambient light or image light. The secondary sensors 115 can be used to determine the throw 25 or image area 35, or to sense the presence of users 10. The type and function of the light sensors 110 and secondary sensors 115 will become clearer with subsequent discussion.

Projector 100 includes one or more light sources (not shown) and image modulation mechanisms (also not shown). These light sources can be lasers, light emitting diodes (LEDs), lamps (such as xenon, tungsten, or metal halide), or combinations thereof. For example, illumination light, which can be pulsed or continuous (CW), can be directed onto one or more spatial light modulators. These modulators, which can be liquid crystal devices (LCDs), micro-mirror arrays devices (such as DLP), or other types of devices, modulate the illumination light using addressed display pixels on a pixel-wise basis to impart the incident video signals to the light to form a two dimensional projectable image. Lens 105 then projects this image, as a series of image pixels 40, onto the display surface 30. Alternately, the projector can have an optical scanner (not shown), such as galvanometer type scanning mirror, which sweeps the image light through the field of view 50 to form the image pixels 40 on display surface 30. For example, light from red, green, and blue lasers can be directly or indirectly modulated in time, to provide light beams. These beams can be combined, and swept by the scan mirror to raster scan the image to image area 35. Alternately, these beams can illuminate one or more linear spatial modulator arrays (such as grating light valve (GLV) type devices), which impart image data to the transiting light in a pixel-wise fashion, a line at a time. The modulators are imaged and scanned through the field of view 50 to form the image to image area 35. It is noted that other projector optical architectures can be used, aside from those just described.

With FIGS. 1 and 2 and the associated discussions providing a framework, the problem addressed by the present invention can now be better understood. Projector 100 is considered to be a small, portable, electronic display, which has a limited optical output (in lumens or watts of visible optical flux). While the small or micro projectors that are used in conference rooms are potentially portable, they have typically been used in fixed or semi-fixed installations. These projectors are large enough (8×6 inches to 8×11 inches) that in practice, portability requires a carrying case. These projectors can produce the optical flux (1000-3000 lumens) to light up a ~140 sq ft. area (10×14 ft) with SMPTE luminance levels (16 ft·L) or higher. In contrast, "pico-projectors", are presently being developed by companies such as Microvision (Redmond, Wash.), Light Blue Optics (Cambridge, UK), or Optoma (Milpitas, Calif.). These projectors, which are small enough to fit in a shirt pocket or as a module in a digital camera or cell phone, will likely enable new patterns of projector usage. However, they are also small enough that the available output flux will be rather limited, to 10-25 lumens at present, and perhaps 100-200 lumens in the long run, as the technology progresses. A 20 lumen pico projector can provide a bright image (16 ft·L) over a small image area (~1 ft$^2$), but when this same 20 lumens is projected onto a larger (20 sq. ft., or 4×5 ft.) display surface, a peak luminance of ~1 ft·L (~3.4 cd/m$^2$) or less is available assuming the display surface lacks screen gain. As stated previously, 3.4 cd/m$^2$ corresponds to the photopic/mesopic transition point, below which vision adaptation to compensate for dim or dark viewing conditions is generally agreed to begin.

A variety of circumstances can readily plunge image brightness deeper into the mesopic range. For example, a user 10 can project the image onto a larger image area 35, reducing the potential peak luminance proportionally. Then during projection, image modulation reduces the brightness; by ~10× for the average movie, and another 50-400× reduction in screen luminance for dark scenes. As another variable, in cinematic projection, the typical screen is a highly efficient Lambertian reflector. Some screens, such as silver based screens, have screen gain, which provides brighter images into a smaller audience area. However, in the case of a pico-projector, a user 10 can project onto any available, reasonably flat, display surface 30. While users 10 are likely to preferentially choose white, or bright, uniform surfaces, colored or grey, light absorbing, surfaces will often be chosen. Patterned or textured display surfaces 30, such as a wall-papered wall, will also be used. Thus, surfaces having uniform or patterned light absorption will often be used, which will further diminish perceived screen brightness. Of course, users 10 may also choose a specularly reflecting surface, such as a metal sheet or mirror, which may provide an effective screen gain, and an increase in perceived screen brightness. Moreover, users 10 may switch between an absorbing surface and a highly gained surface during a viewing event. In summary, the viewing conditions, and specifically the images, will be more dynamic, unpredictable, and often darker, then experienced by projector viewers in the typical theatre or conference room.

Figure 3:
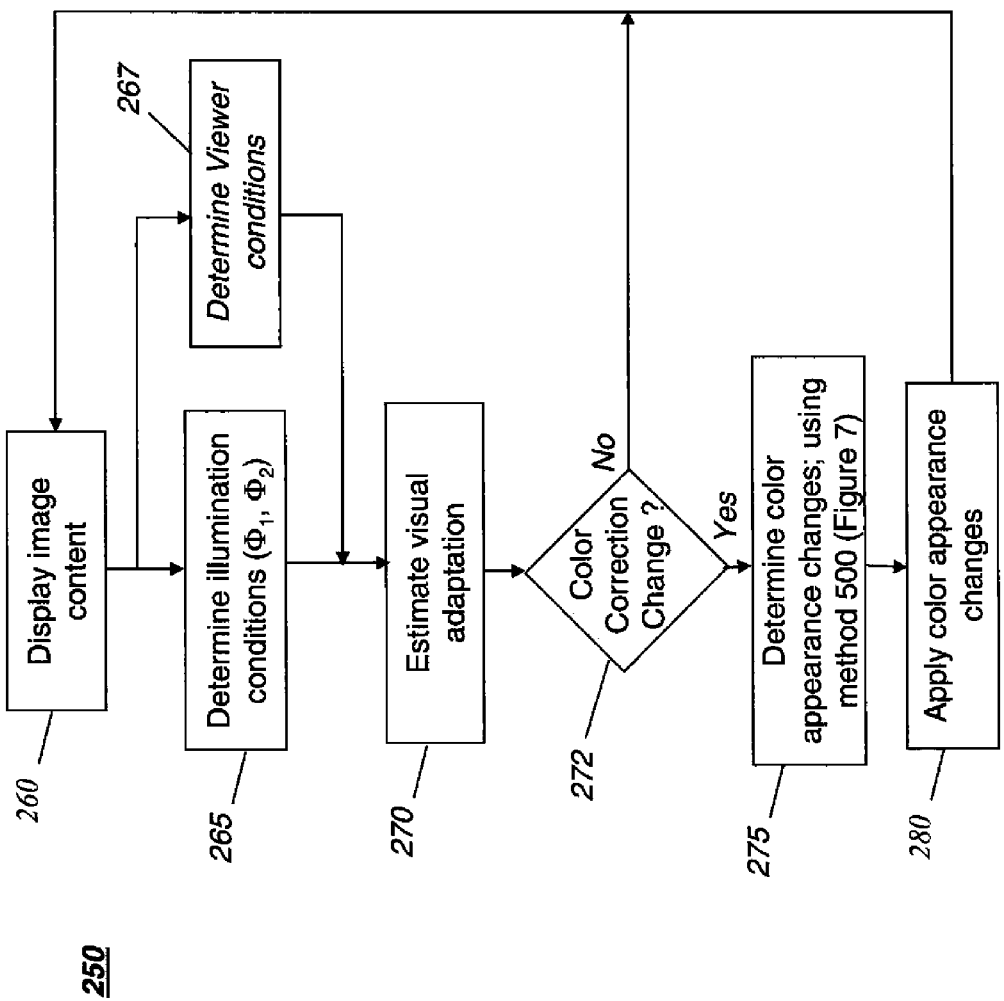
FIG. 3 illustrates the overall method of operation of the projector of the present invention.

As the prior discussion indicates, users of portable displays, and particularly micro or pico projectors, will be viewing image content in darkened conditions. Moreover, as the viewed images will often be dim, users will choose environments 20 with dimmed ambient lighting 55, or they will deliberately dim the ambient lighting to improve image perception (less flare light, higher image contrast). As a result, the users will often view the projected image content under sufficiently dim conditions that users will experience mesopic conditions and the accompanying luminance level adaptation. Therefore, it can be useful to provide a projector 100 or display that is equipped with a method to enhance the color appearance of the displayed content so as to provide an improved viewing experience for the mesopically adapted observer. FIG. 3 depicts an exemplary low luminance display correction method 250 of the present invention, in which as the step of image display (260) continues, illumination conditions (for ambient light $\Phi_2$ and display light $\Phi_1$) and viewer conditions are determined by steps 265 and 267 respectively. The resulting viewing environment data is analyzed to estimate the visual adaptation (step 270) of one or more viewers, which particularly includes the viewer brightness adaptation, but also possibly the viewer chromatic adaptation. Those results are provided as input for determining whether a color correction change is appropriate or not (step 272) and if so, they are then used to determine the color appearance changes to enhance the image content for the visually adapted viewers (step 275). The determined color attribute changes are then applied or rendered to the image content (step 280), and the corrected image content is displayed (step 260). The display of image content (step 260) can continue until it is again determined that the illumination conditions or viewer conditions have changed again sufficiently that another color correction change is appropriate. FIGS. 8a and 8b depict an example of this operative method, where changes in visual adaptation and color rendering occur sequentially in time in relation to luminance level changes. Both the underlying science and operational aspects of the low luminance display correction method 250 will become clearer with subsequent discussion.

Visual Adaptation

Figure 4:
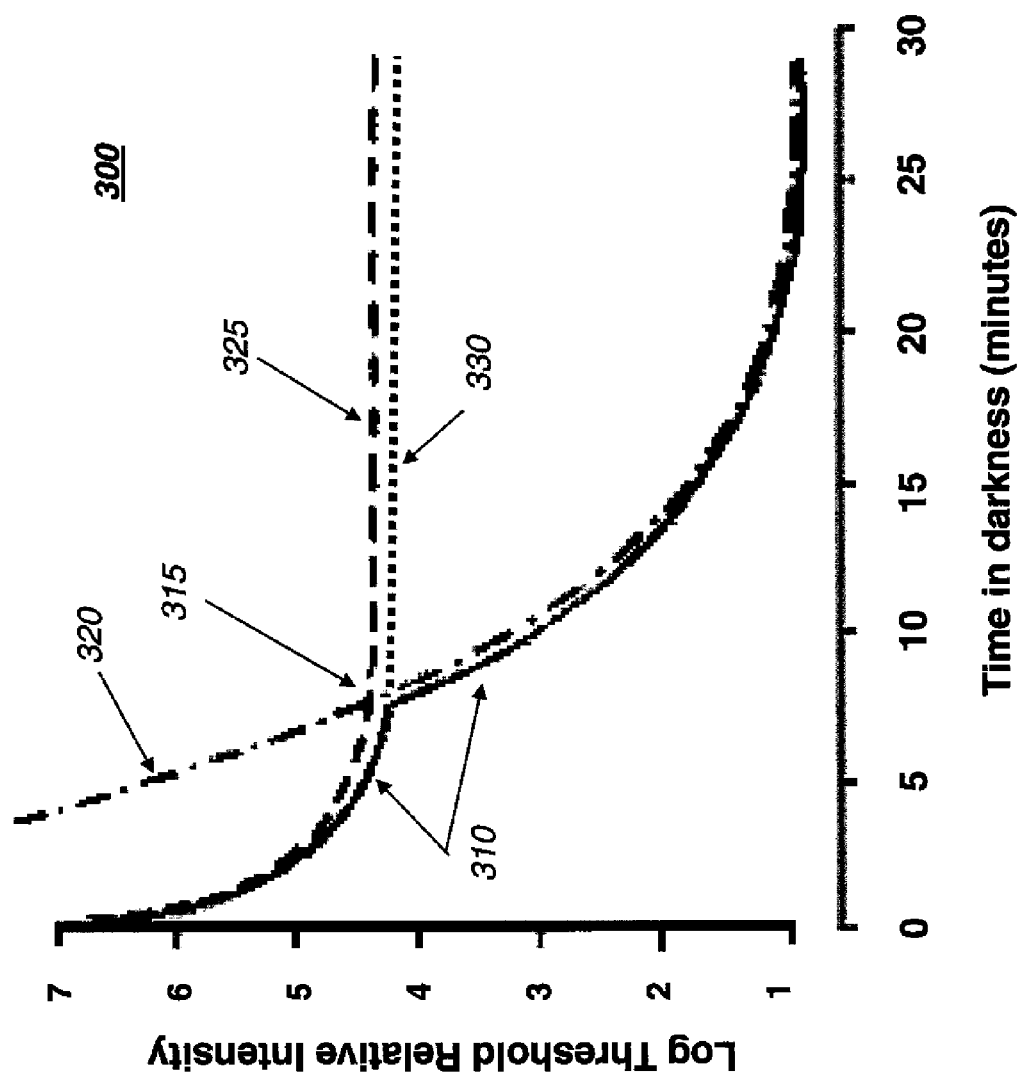
FIG. 4 is a graph of the course of human dark adaptation versus time.
Figure 5:
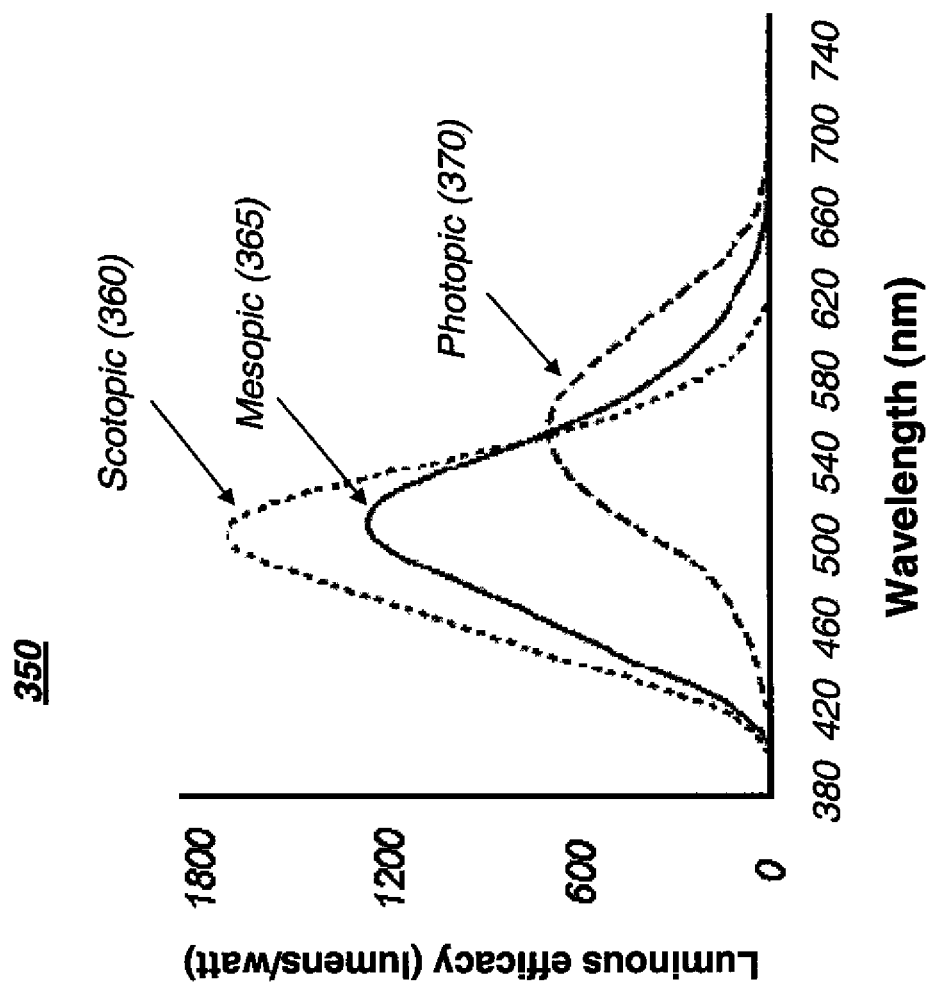
FIG. 5 is a graph of the spectral visual responses for human photopic, mesopic, and scotopic vision.

The concepts of brightness adaptation and mesopic vision can be better understood from consideration of eye function and the graphs supplied with FIGS. 4 and 5. As is widely understood, light detection in the human eye is enabled by two types of cells, cones and rods. The wide, cone-shaped cells of the retina are most sensitive in bright (photopic) light conditions. The response of the cones depends upon the concentrations of the chemical iodopsin (a photo-pigment), with visual sensitivity, and the ability to see greater detail and color depending on the brightness and iodopsin concentrations. In greater detail, in the human eye there are three types of cones to sense light in three respective bands of color. The biological pigments (opsins) of the cones have maximum absorption values at wavelengths of about 420 nm (blue), 534 nm (Bluish-Green), and 564 nm (Yellowish-Green). Their sensitivity ranges overlap to provide vision throughout the visible spectrum. As a result of these absorption peaks, and the relative abundance of the three types of cones, human brightness sensitivity peaks in the green part of the spectrum. Hence the luminous efficiency function standardized by the CIE peaks at 683 lumens/Watt at a wavelength of 555 nm.

By comparison, the long, thin rods are most sensitive in dim light. In the dark, a photo-pigment called rhodopsin, or visual purple, increases in the rods, improving their sensitivity. By contrast, in dark circumstances, the cones do not receive enough light for chemical reactions to take place, and their contributions to vision diminish. The combined effect of the rods and cones can be understood from the dark adaptation graph 300 depicted in FIG. 4. The temporal response of the eye follows the brightness adaptation curve 310, which represents the visual response of the typical viewer who is subjected to sudden darkness. Normal brightness adaptation to sudden darkness occurs in two phases, where above the rod-cone break 315, vision perception is dominated by the more sensitive cones, and below the rod cone break 315, the low light sensitive rods dominate. Similar graphs are available that depict the temporal course of brightness adaptation of the normal human eye to sudden increases in light level or brightness. These graphs show a bi-phasic behavior that is compressed, as vision adapts much more quickly to sudden brightness than to sudden darkness.

For comparison, FIG. 4 also shows a color blind person's brightness adaptation curve 320. Depending on the individual, cones can be compromised, defective, or absent, from lack of sufficient photo-sensitive pigments, for example. In the example of FIG. 4, the color blind brightness adaptation curve 320 shows a delayed response to sudden darkness, as the rapid response of the cones is unavailable. By comparison, night-blind person's brightness adaptation curve 325 shows very little change in visual sensitivity with increasing time in darkness. This can occur because the rods are damaged or defective, while the cone sensitivity 330 flat-lines.

Again considering the two-phase normal brightness adaptation curve 310 which shows the response of vision to sudden darkness, the human visual system is capable of perceiving luminance levels in the range of 10 (or more) orders of magnitude. Within this range, the eye will adapt and can observe about five orders of magnitude of luminance simultaneously. The eye has several mechanisms to compensate for changing illumination levels. Firstly, the iris changes the size of the pupil to let in more or less light depending on available light. The pupil diameter can contract to 1.5 mm or expand to 7 mm in only 1 or 2 seconds. However, pupil aperture change compensates for brightness changes by a factor of less than 100×. In responding to dim or dark conditions, changes in cone sensitivity are the next primary contributor, depending on the expression of the opsins. However, as the cone sensitivity diminishes, the relative perceived brightness of colors also experiences a blue shift (see FIG. 5). Cone cells reach nearly total adaptation in about 10 minutes (reaching the rod-cone break 315). As light levels fall, the eye switches from cone cells which are used when there is abundant light, to the rod cells that are more effective under dim conditions. While rods contribute to visual perception above the rod-cone break 315, they dominate below it. To enable perception of yet lower light levels, the rhodopsin concentration inside the rod cells changes, changing their sensitivity. As curves 310 and 320 show, most of the change occurs in dark adaptation occurs over the first 20 to 30 minutes. Eventually other mechanisms, such as neural adaptation and retinal summation also contribute, such that over 2 hours, rod cells can achieve total dark adaptation and sensitivity. Once fully night adapted, a human eye is sufficiently sensitive to see a single candle at a distance of 10 miles.

Primary interest is directed towards color perception in the mesopic visual range, above the rod-cone break 315, where brightness sensitivity changes primarily via the mechanisms of pupillary aperture control and cone photo-pigment concentration changes. FIG. 5 shows that the photopic response 370, relative to spectral luminous efficacy 350, is peaked at 555 nm, with 683 lumens/watt conversion efficiency. Comparatively, the dark adapted or scotopic response 360 is centered at 507 nm, with 1700 lumens/watt conversion efficiency. The mesopic response 365 is intermediate in spectral luminous efficacy, being peaked at ~510 nm at ~1200 lumens/visible watt. In the scotopic and mesopic ranges, brightness sensitivity is blue shifted, with significantly less brightness sensitivity for the high green, yellow, orange, and red colors. As brightness sensitivity changes differentially in response to decreasing luminance, it has been shown that color constancy and other color perception attributes suffer. In general, human perception of yellow, orange, and red colors becomes less accurate. Human perception of blue and low green colors also suffers, but less dramatically.

These changes in turn effect human perception of the appearance of colorful objects. Color vision, color perception, color appearance modeling, and color reproduction are discussed extensively in a series of books by R. W. G. Hunt. Color measurement and modeling is also subject to standardization, particularly by the CIE. Visual adaptation for changing luminance levels has been studied by many, and aspects are summarized in the paper, "*Change of Color Appearance in Photopic, Mesopic, and Scotopic Vision*", by J. C. Shin et al., Optical Review, Vol. 11, pp. 265-271, 2004, in which the authors review how color perception shifts with adaptation from the photopic to mesopic and scotopic ranges. In an accompanying paper by J. C. Shin et al., entitled "*A Color Appearance Model Applicable in Mesopic Vision*", published in Optical Review, Vol. 11, pp. 272-278, (2004), the authors propose a color vision model that they suggest is useful for predicting color appearance under mesopic viewing conditions. Their color appearance model is based on perceptual experiments carried out using a limited set of color chips, relative to chroma, lightness, and hue, for different luminance conditions. While this model is illustrative relative to modeling perceptual color changes in the mesopic range, and has the advantage of computational simplicity, its accuracy is limited by the gamut of color chips used in the perceptual experiments, and the empirical approximations used to fit the experimental data. Specifically, the model does not address the use of highly saturated primaries such as might be used in a laser or LED projector.

Color Correction

Given that as the eye adapts to increasing dimness, that brightness sensitivity shifts to the blue, while sensitivity to yellow, orange and red light (and therefore colors) diminishes, it can be desirable to alter image content in a compensatory way, to provide a color perception experience closer to the original content. Of course, if the display output luminance can be changed to increase on screen light levels in one or more colors, that would be advantageous. But in many cases, such as small portable or "pico" projectors, maximum output luminance is likely already being used. Additionally, even if output luminance is increased, for example, by switching from battery to wall-plug power, display luminance levels will often remain dim. Therefore, other compensating mechanisms can provide benefits. In particular, for the various colors, and particularly for the red and green, color saturation and hue can be changed. Blue luminance can also be decreased, or blue colors can be shifted in hue and saturation to help color correction. In general, image content conceptually is altered to have less blue and more green and yet more red relative to saturation, hue, or colorfulness. Color correction can also be biased to emphasize rendering whites, neutrals, and memory colors, such as skin tones, to look reasonably correct.

Color correction of electronic displays is generally known to those skilled in the art. An exemplary prior art method for adapting a display 400, as shown in FIG. 6, comprises a series of steps that can be used to optimize the color output of an electronic display, as commonly applied during factory calibration, or less commonly during occasional field calibration by a skilled user. Such methods are known in the art and can be found in standard texts, for example, *Digital Color Management: Encoding Solutions* by Giorgianni and Madden (Addison-Wesley, Reading, Mass., 1998, FIG. 4.3 and supporting text). The method (400) enables preparation of images for display on a device that produces photopic luminances, for which perceived color hues are constant and color saturation is normal. An image input signal, composed of a plurality of input pixel signals, each input pixel signal having at least three color components and coded in an image input color space, is received during image signal input step 405.

The image input color space can be any of a number of color encoding spaces appropriate to the image source, for example the sRGB color standard for still images. The image input code values are transformed to RGB intensity values in a calculation within compute RGB intensities step 410, which correspond to the relative intensity (0-1 scale) in each channel and at each pixel of the display. This transformation usually involves at least two steps (within step 410) well known in the art. The first is a tonescale transformation step in which the input image code values are mapped from the nonlinear tonescale of the input color space (e.g., gamma of 2.2 for sRGB) and RGB intensities are computed (step 410) which are linear with the luminance output of the display device. The second is a matrix multiplication that converts the linearized code values from the primaries assumed by the source color encoding (Rec. 709 for sRGB) to the color primaries of the display device, the final result of which is the computation of linear RGB intensities (step 410) in the color space of the display device.

After the RGB intensities are computed (step 410), it is known in the art to modify the RGB intensities of the colors reproduced on the display, to correct for deficiencies in the source image, the electronic display, or the viewing environment. In particular, the color saturation can be modified via modify color saturation step 415, or the color hue may be modified via modify color hue step 420 for some or all of the colors reproduced on the display by numerical adjustment of the RGB intensities. Using the known physical characteristics of the display primaries, the photopic XYZ tristimulus values, which are appropriate for normal viewing conditions, can then be computed per compute photopic XYZ values step 425. The physical characteristics of the display primaries are typically characterized by taking colorimetric measurements of the individual primaries as a function of signal level, resulting in a derived mathematical relationship between input RGB intensities and output photopic XYZ tristimulus values. The resulting XYZ values, incorporating the color saturation and color hue modifications, can then be assessed with evaluate reproduced colors step 430, to determine the success of the color reproduction of the displayed image. This evaluation can be based on the computed XYZ tristimulus values or on new measurements of the XYZ tristimulus values. Also, any errors associated with the current state of the device color reproduction can be checked during error evaluation step 435, against a set tolerance. If the error is within the tolerance, the output image signals are sent to the display, via output image signals step 440. If the error remains outside of tolerances, further modifications to color saturation and color hue are made to the RGB intensities to bring the colors within tolerance. Once the reproduced colors are determined to be within tolerance relative to the deficiencies in the source image, the electronic display, or the viewing environment, are determined via step 435, the display correction method (400) concludes with the resulting output image signals step 440 for subsequent image display. These output image signals can take the form of digital code values, computed by a reverse encoding of RGB output intensities (an inverse of step 410), or correction values that can be applied to the original image input signals to effect the desired color appearance correction.

However, while the prior art method of FIG. 6 is widely used to successfully color correct image displays for viewing in photopic conditions provisions for color correction for mesopically adapted viewers are not included, either by design or inherent function. In particular, prior art methods, such as those of FIG. 6 assume normal color saturation and that perception of color hues is constant. However, in the mesopic visual range, perception of color hues and colorfulness is shifting differentially for RGB color primaries. A new method is thus needed for providing color correction for mesopically adapted viewers.

A novel method of preparing an image for display on a device producing low luminances, for which perceived color hues are not constant and color saturation is weakened, is now described. As shown in FIG. 3, the exemplary low luminance display correction method 250 can estimate the viewer's visual adaptation based on available viewing environment data for illumination conditions and viewer conditions, including applying knowledge of the adaptive response (FIGS. 4 and 5), and determine whether a color correction is appropriate (step 272). When an affirmative answer occurs, a step 275 to determine appropriate color appearance changes then follows. Step 275 is realized by the exemplary luminance adaptive color correction method 500 shown in FIG. 7. As in the prior art, the exemplary luminance adaptive color correction method 500 begins with input image signals being received at an image signal input step 505. In a digital imaging system these input image signals are code values related to the RGB intensities to be displayed. As a commonplace example, they can be encoded as 8-bit integers (0 to 255 scale), and may be linearly proportional to intensity or non-linearly related to intensity. RGB intensities for the display are then computed at step 510. If the input image signals are linearly related to RGB intensities, then the RGB intensities computed here can be values normalized on a 0 to 1 scale. At this point, due to the much lower display luminances and the associated adaptation state of the observer, the subsequent procedure for modifying the RGB intensities is then very different than the prior art method of FIG. 6. The photopic XYZ tristimulus values are next computed (at step 525) for input to color appearance modeling steps. In parallel, viewing environment data can be received per step 530. This data results from operation and analysis of data detected from light sensors 110 and any secondary sensors 115 that measure the viewing environment, per the determine illumination conditions step 265 and determine viewer conditions step 267 of the low luminance display correction method (FIG. 3). That resulting data can be analyzed to estimate and track (step 270) the brightness adaptation of any viewers 10 using a degree of adaptation factor ($F_L$) or other appropriate metrics. These results are provided to the luminance adaptive color correction method 500 at step 530. More details of the CAM viewing environment data will be given shortly.

Subsequently, the luminance adaptive color correction method 500 proceeds to a photopic color appearance model (CAM) analysis step 540 that characterizes the response of the photopic (average luminance-adapted) observer and a parallel mesopic CAM analysis step 545 that characterizes the response of the mesopic (low luminance-adapted) observer. Because the low luminance conditions affect the perceived hue, and greatly reduce the perceived saturation of the displayed colors, the photopic and mesopic color appearances are different.

The color appearance model used in steps 540 and 545 can be any empirical or semi-empirical model that takes as input physical measurements of the colors to be reproduced on the display, or quantities directly related to such measurements, and gives as output quantities that characterize the viewers response to the appearance of the reproduced colors. Numerous CAMs have been proposed for photopic viewing, which vary depending on accuracy, computation speed, display properties, etc. Few CAMs have been proposed for mesopic viewing, and mesopic adaptation and perception is still an area of active research. In the preferred embodiment, the CIECAM97c model is used, although other CAMs can be used as long as they are valid for both photopic and mesopic luminance ranges. The CIECAM97c model is described in the text by R. W. G. Hunt, *Measuring Colour*, 3$^{rd}$ Edition, Fountain Press, 1998, Chapter 12.

The inputs to the CIECAM97c model are: the tristimulus values XYZ of the color as reproduced on the display; the tristimulus values $XYZ_w$ of the white point of the display; the photopic luminance $L_A$ of the adapting field, the scotopic luminance $L_{AS}$ of the adapting field, the scotopic luminance $S_s$ of the color as reproduced on the display; the scotopic luminance $S_w$ of the adapted white; and the relative luminance $Y_b$ of the background.

The most important effect to be modeled for the viewing of low-luminance displays is brightness adaptation, which the CIECAM97c model accounts for through a brightness (darkness) adaptation factor $F_L$, is given by the following equation:

$$F_L = 0.2k^4(5L_A) + 0.1(1-k^4)^2(5L_A)^{1/3}$$

where $L_A$ is the luminance of the adapting field, and $k=1/(5L_A+1)$. Note that $F_L$ depends only on $L_A$. The significance of the factor ($5L_A$) in this equation is that typically $L_A$ is taken to be 20% of the display white point (20% gray); therefore, the display white point $XYZ_{wp}$ is the input that defines $L_A$, via the absolute luminance component $Y_{wp}$, and we then have $L_A = Y_{wp}/5$.

There are four additional inputs describing the viewing environment that must be specified to undertake the modeling, many pertaining to chromatic adaptation: the impact of the surround (c); the lightness contrast factor (F_LL); the chromatic surround induction factor (Nc); and a factor D setting the degree of chromatic adaptation. The factor D, which depends on the luminance $L_A$ and a chromatic adaptation factor (F), ranges from 1 (complete chromatic adaptation) to 0 (no chromatic adaptation). The factor D may be understood to represent the physiological changes in the visual system that underlies chromatic adaptation, or the effect that is described as cognitive discounting of the illuminant. The latter refers to the ability of an observer to successfully identify colors under a change of illuminant (color constancy), before physiological adaptation is complete. For the current illustrative purposes, it suffices to use the two limiting cases of complete chromatic adaptation (D=1), which is equivalent to cognitive discounting of the illuminant, or no chromatic adaptation (D=0), which is equivalent to no cognitive discounting of the illuminant. As noted in Hunt, Section 6.12, significant departures in people's ability to affect color constancy are observed at low light levels. In particular, it is not expected that chromatic adaptation to be operative in the mesopic range. Therefore, it is appropriate and illustrative to disable chromatic adaptation (D=0) for the mesopic case in the CAM. However, partial chromatic adaptation can occur, and be modeled as well, for example by intermediate values of the degree of chromatic adaptation D produced by the equation given in Hunt.

Before further explaining the setting of the other environment parameters, some definitions are necessary. The following are taken from the text by Hunt: "The color element is the color patch considered, assumed to be uniform and having an angular subtense of 2 degrees; the proximal field is the immediate environment of the color element, extending for about 2 degrees from the edge of the color element in all directions; the background is the environment of the color element, extending about 10 degrees from the edge of the proximal field in all directions (if the proximal field is the same color as the background, the background is regarded as extending from the edge of the color element, an assumption that will be used in this analysis); the surround is the field outside the background; and the adapting field is the total environment of the color element, including all of the above and extending to the limit of vision in all directions (including peripheral vision, human vision spans ~180°)." With these definitions as background, it is noted that the parameter c of the CAM adjusts the brightness response to account for different surrounds, the parameter Nc adjusts for the fact that dark or dim surrounds to colors can reduce their colorfulness, and the parameter F_LL accounts for nonlinear lightness contrast effects.

As explained in Hunt, various settings for these parameters describe different viewing environments. The applicants have found by experience that there are certain advantageous combinations of parameters, some of which are relevant in practicing the invention. In particular, in performing step photopic CAM analysis step 540 the viewing environment parameters are set to the following exemplary values, which are appropriate for an "average" surround: c=0.69, Nc=1.0, F_LL=1.0, and D=1 to define a reference. Here the effect of dim surrounds on colorfulness (Nc) is excluded, as well as the lightness contrast nonlinearities (F_LL). Chromatic adaptation is assumed complete in the photopic case (D=1). In performing mesopic CAM analysis step 545 the viewing environment parameters can be set to the following exemplary values, which are appropriate for a "dark" surround: c=0.525, Nc=0.8, F_LL=1.0, and D=0. Here some effect of dim surrounds on colorfulness (Nc) is included, but exclude lightness contrast nonlinearities (F_LL). Again, for this illustrative example, no chromatic adaptation is assumed in the mesopic case (D=0).

The output of the CIECAM97c model is a set of color appearance parameters that correlate with various attributes of color perception: lightness (J), chroma (C), hue angle (h), brightness (Q), saturation (s), colorfulness (M), and hue quadrature (H). The brightness Q and lightness J are related but not identical; lightness J is brightness judged relative to the brightness of the adopted white, whereas B is on an absolute scale. Both B and J are functions of the achromatic component of color stimuli, and are not the focus here. Hue angle h and hue quadrature H are different measures of the same quantity; h indicates the absolute angular position of a color in polar coordinates (and hence ranges from 0 to 360 degrees), while H is a composite angular measure of hue, wherein unique red and green are opposite each other (at 0 and 200, respectively), and unique yellow and blue are also opposite each other (at 100 and 300, respectively). The last three parameters M, s, and C all refer to the perception of the strength of a hue. Colorfulness M is the basic attribute that refers to the perception that a color exhibits more or less of its hue; saturation s refers to the colorfulness of an area judged in proportion to its brightness; and chroma C refers to the colorfulness of an area judged in proportion to the brightness of a similarly illuminated area that appears to be white. The non-angular parameters, with the exception of s, generally range between 0 and 100, with a higher value indicating more of the attribute, while the saturation s can exceed 100.

As the values of the color appearance parameters for the photopic and mesopic cases are compared, differences will become apparent. In particular, the values of the hue angle h and colorfulness M will change as the luminance of a color decreases into the mesopic range. It is observed that the colorfulness M is greatly reduced as the peak display luminance decreases into the mesopic range below 3 cd/m², and that the hue angle h changes noticeably for some colors. This latter change occurs because of the increasing influence of the rods on vision at low light levels, and the inherently higher blue luminosity response of rods as compared to the cones.

In the cases of interest, the display will have a low peak luminance, and the colors on the display will appear to be shifted in hue and less colorful. Due to the decreased amount of luminance available from the display, it will be difficult if not impossible to correct for the full loss of colorfulness. However, some corrections for the apparent hue shifts, and to some limited extent the colorfulness loss, due to mesopic adaptation are possible. This is accomplished in step 550, wherein the mesopic color appearance parameters are modified by comparing their values to those that would have been perceived with a much brighter display, with the observer photopically adapted, and setting some, but not all, of the mesopic color appearance parameters to new values, based on the photopic targets. As an example, for analysis purposes, the photopic color appearance parameters associated with a bright display viewed by a photopically adapted observer, as used in step 540, to be denoted $[J_p\ C_p\ h_p\ Q_p\ s_p\ M_p\ H_p]$, corresponding to lightness, chroma, hue angle, brightness, saturation, colorfulness, and hue quadrature. Similarly, mesopic color appearance parameters used in step 545 is defined as $[J_m\ C_m\ h_m\ Q_m\ s_m\ M_m\ H_m]$. To implement a hue correction for perceived hue under mesopic adaptation for a low luminance display, it is recognized that colorfulness and brightness cannot be fully restored due to light output limitations in the display. Thus, the modify mesopic color appearance parameters step 550 modifies the mesopic color appearance parameters as follows: $[J_m\ C_m\ h_p\ Q_m\ s_m\ M_m\ H_p]$. In this case, only the hue values (h, H) have been modified, by setting them to the photopic values. Other modifications are possible in step 550, within the limitations of the display output, i.e. $[J_m\ C'_m\ h_p\ Q_m\ s_m\ M'_m\ H_p]$, wherein an attempt can be made to increase the colorfulness as well as correct the hue. This is indicated with the alternate primed values for mesopic chroma ($C'_m$) and colorfulness ($M'_m$).

To undertake the modification step 550 in the appearance of a color under reduced display luminance, it is necessary to define a reference for comparison. As has been described, a photopic (average luminance-adapted) observer is the basis for comparison. In practical terms, this corresponds to some display with a peak luminance that is high enough such that only photopic effects are operative in the CAM, even as image content modulates the output luminance values lower. Experiments conducted by the applicants have shown that the use of an adopted white point of 1000 cd/m² or higher is more than sufficient to guarantee that the CAM models photopic perception. Therefore, the color appearance parameter values obtained from the CAM using an adopted white point of 1000 cd/m² are used as the preferred reference.

The following illustrative examples are provided to further explain the steps of FIG. 7. In this example, the series of steps is followed for the hue correction of a display assumed to have a peak luminance of 3 cd/m², while also assuming that the viewer is mesopically adapted. It is also assumed that the display is composed of red, green and blue primaries, which as an example, can have a spectral lineshape approximated by Gaussian curves of full width half maximum (FWHM) 20 nm and central maxima located at 450 nm, 550 nm and 650 nm, and a display white point color temperature of D65. Table 1 shows the three-channel numerical data for three selected colors after three steps in the method, namely steps 505, 510 and 525. The colors chosen are fairly saturated and are of nominal hues red, green and blue, respectively, as indicated in the first column. In the first section of the Table, the image input signals, received in step 505 in the form of integer code values ranging from 0 to 255, are shown in columns 1-3 for the red (R), green (G) and blue (B) channels respectively. (Note that a nominally red, green and blue color can have non-zero R, G and B signal components.) In the second section of the Table, the code values have been converted as in step 510 to normalized linear RGB intensities, via simple division by 255, to place the numbers on a 0-1 scale. As described earlier, this step need not be linear, and depends on the encoding of the original image signals. The third section of the Table shows the results of step 525, in which the linear RGB intensities have been converted to XYZ tristimulus values, using the standard formulae (Giorgianni and Madden, p. 21) given below:

$$X = k \sum_{\lambda=380}^{780} S(\lambda)\bar{x}(\lambda)$$

$$Y = k \sum_{\lambda=380}^{780} S(\lambda)\bar{y}(\lambda)$$

$$Z = k \sum_{\lambda=380}^{780} S(\lambda)\bar{z}(\lambda)$$

In these formulae, X, Y and Z are the CIE tristimulus values, $S(\lambda)$ is the spectral power distribution of the display, $\bar{x}(\lambda)$, $\bar{y}(\lambda)$ and $\bar{z}(\lambda)$ are the color-matching functions of the CIE Standard Colorimetric Observer, and k is a normalizing factor. Here k has been determined to provide the target display luminance Y=3 cd/m² when the input is a perfect white (R=G=B=255 code value), consistent with the white point color temperature of D65.

TABLE 1

Data after Steps 505, 510 and 525 in Example 1

| Code Value | R | G | B |
|---|---|---|---|
| red | 242 | 26 | 26 |
| green | 26 | 204 | 26 |
| blue | 26 | 26 | 255 |
| Intensity | R | G | B |
| red | 0.95 | 0.1 | 0.1 |
| green | 0.1 | 0.8 | 0.1 |
| blue | 0.1 | 0.1 | 1 |
| Tristimulus | X | Y | Z |
| red | 0.8027 | 0.3649 | 3.0797 |
| green | 1.0679 | 2.0448 | 0.3466 |
| blue | 1.297 | 0.6879 | 0.3267 |

Next, Table 2 shows the results of steps 530 through 550, in which the computed XYZ tristimulus values are inputted, along with viewing environment data, to the CIECAM97c model. Section 12.22 of Hunt gives a fully detailed description of the steps in the computation of the color appearance parameters along with a numerical example. Briefly, the major steps are: (1) compute transformed tristimulus values; (2) compute degree of chromatic adaptation; (3) compute tristimulus values for a reference, equal-energy stimulus; (4) compute luminance adaptation effects; (5) compute cone responses; (6) compute correlates of redness-greenness, yellowness-blueness, and hue angle; (7) compute achromatic response; and (8) compute color appearance parameters.

The first section of Table 2 shows the results of photopic CAM analysis step 540, in which the color appearance parameter values have been computed for the three test colors under the photopic reference condition, i.e. the display with peak luminance of 1000 cd/m², and using the environment and adaptation parameters given above for average surround (c=0.69, Nc=1.0, F_LL=1.0, and D=1). The second section of Table 2 shows the results of mesopic CAM analysis step 545, in which the color appearance parameter values have been computed for the three test colors under the mesopic condition, i.e. the display with peak luminance of 3 cd/m², and using the environment and adaptation parameters given above for dark surround (c=0.525, Nc=0.8, F_LL=1.0, and D=0). Comparing the two sections, we see that, as expected, the chroma (C), colorfulness (M) and saturation (s) parameters have all decreased significantly as the display luminance has dropped. Also, hue changes (h and H) have occurred. The third section of Table 2 illustrates the result of step 550, in which the mesopic color appearance parameter values of step 545 have been transferred, but with the hue angle (h) and hue quadrature (H) parameters selectively replaced by the values of the photopic color appearance parameters of step 540. It is noted that new (primed) values for the mesopic parameters, mesopic chroma ($C'_m$) and colorfulness ($M'_m$) can also be generated, but such an example is not included in Table 2.

TABLE 2

Data after Steps 530 through 550 in Example 1.

| 1000 cd/m² | $J_p$ | $C_p$ | $h_p$ | $Q_p$ | $s_p$ | $M_p$ | $H_p$ |
|---|---|---|---|---|---|---|---|
| red | 50.4 | 78.7 | 276.2 | 67.1 | 218.5 | 78.7 | 319.8 |
| green | 90.0 | 71.5 | 128.4 | 99.0 | 170.0 | 71.5 | 160.4 |
| blue | 70.0 | 86.5 | 19.4 | 83.7 | 235.1 | 86.5 | 399.2 |
| 3 cd/m² | $J_m$ | $C_m$ | $h_m$ | $Q_m$ | $s_m$ | $M_m$ | $H_m$ |
| red | 68.5 | 34.2 | 284.4 | 8.2 | 61.5 | 25.6 | 324.6 |
| green | 89.1 | 32.5 | 140.9 | 9.8 | 54.2 | 24.3 | 175.7 |
| blue | 75.2 | 26.8 | 14.7 | 8.6 | 42.5 | 20.1 | 394.3 |
| 3 cd/m² (modified) | $J_m$ | $C_m$ | $h_m = h_p$ | $Q_m$ | $s_m$ | $M_m$ | $H_m = H_p$ |
| red | 68.5 | 34.2 | 276.2 | 8.2 | 61.5 | 25.6 | 319.8 |
| green | 89.1 | 32.5 | 128.4 | 9.8 | 54.2 | 24.3 | 160.4 |
| blue | 75.2 | 26.8 | 19.4 | 8.6 | 42.5 | 20.1 | 399.2 |

Next, Table 3 shows the results of steps 560 through 575, in which the modified color appearance parameter values of step 550 are applied and tested. To begin with, the modified parameter values are input to the inverse CAM analysis step 560, which produces XYZ tristimulus values. This process applies the inverse CIECAM97c model, following procedures for inverting the CIECAM97c that are given by Hunt. The inverse CIECAM97c model yields the XYZ tristimulus values of the colors on the display that are required to elicit the perceived color specified by the CIECAM97c parameters. These tristimulus values (and subsequent quantities) are denoted with primes in the Table to distinguish them from the corresponding quantities in the input steps. Once the XYZ's are known, the corresponding RGB's, or normalized intensities, can be computed during the subsequent re-compute RGB intensities step 565. This can be done using the concept of the phosphor matrix, a term which developed during the days of cathode-ray tube (CRT) technology. The phosphor matrix, or pmat, is a 3×3 matrix that relates the XYZ tristimulus values to the RGB normalized intensities as follows:

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \begin{bmatrix} R \\ G \\ B \end{bmatrix}$$

In this case, XYZ are the tristimulus values of the resulting color on the display, RGB are the normalized intensities of the color signals in the three channels, and $[X_R\ Y_R\ Z_R]$, $[X_G\ Y_G\ Z_G]$ and $[X_B\ Y_B\ Z_B]$ are the tristimulus values of the individual red, green and blue color primaries. This can be written compactly as:

$[XYZ] = [pmat][RGB]$ as can the corresponding inverse operation, which is used in step 565:

$[RGB] = [pmat]^{-1}[XYZ]$

The resulting RGB' normalized intensities are shown in the second section of Table 3. The subsequent test RGB intensities step 570 entails inspection of these intensities to ensure that they are valid, meaning greater than or equal to zero; in this case they are, so the process continues to the output RGB intensities step 575. The case in which the intensities are invalid (i.e. less than zero) will be discussed shortly. In step 575, the RGB' normalized intensities are linearly scaled by a factor of 255 to result in output image signals represented by RGB' integer code values on a 0-255 scale. These are shown in the third section of Table 3.

TABLE 3

Output Data after Steps 560 through 575 in Example 1.

| Tristimulus | X' | Y' | Z' |
|---|---|---|---|
| red | 0.7086 | 0.3628 | 3.0676 |
| green | 1.1919 | 1.9962 | 0.0288 |
| blue | 1.222 | 0.6382 | 0.1695 |
| Intensity | R' | G' | B' |
| red | 0.95 | 0.12 | 0.00 |
| green | 0.00 | 0.75 | 0.32 |
| blue | 0.05 | 0.09 | 0.97 |
| Code Value | R' | G' | B' |
| red | 241 | 30 | 0 |
| green | 0 | 190 | 81 |
| blue | 13 | 22 | 248 |

As discussed previously, it is presumed that projector 100 has a limited amount of light available to display image content or to correct the display colors. Therefore, in this example the goal has been to selectively correct the hue shift due to mesopic adaptation, as predicted by the color appearance model. In Table 2, it is seen that the red color perceived hue angle increases under mesopic adaptation from 276.6 to 284.4, which corresponds to a counter-clockwise (ccw) rotation in the hue space. By substituting the photopic values for the hue angle and hue quadrature (h, H) in place of the mesopic values the code values that are necessary to arrive at the colors that are derived when displayed and viewed by the mesopically adapted observer on a display of low peak luminance (3 cd/m$^2$), will approach or match the appearance they would have to a photopically adapted observer on a display of much higher peak luminance (1000 cd/m$^2$). The resulting computed compensation in code values is to increase the G code value from 26 to 30, decrease the B code value to zero, and hold the R code value nearly constant at 241. Since green is ccw in the hue space from red, this should have the desired effect. Similarly, the prescribed increase in B code value and decrease in the G code value for the green color can be understood as a ccw rotation in hue space to counteract the clockwise rotation towards the green under mesopic viewing (128.4 to 140.9 in h value).

Returning to test RGB intensities step 570, the RGB intensities obtained via the inverse pmat, based upon the XYZ tristimulus values computed from the inverse CIECAM97c model, can be negative valued, and are thus invalid for conversion to output image signals. This is an indication that the effect of mesopic viewing for the particular color under consideration cannot be fully corrected, because either there is not enough light available in the display for correction (the peak intensity of one or more of the RGB display primaries has been exceeded), or the required color is outside the gamut of the display primaries. The color gamut is the set of colors that the display can represent, and is limited by the spectral lineshape and peak wavelength of the RGB primaries, as well as the maximum output of the individual primaries. The latter problem occurs less frequently for laser projectors, whose primaries have a very narrow spectral width and a broad color gamut, and more frequently for liquid crystal displays or projectors using white light sources with RGB color filters. In such cases, the values of the selected mesopic color appearance parameters cannot be changed to match photopic equivalent values, and lesser corrections can be considered. If full correction is not possible, options include: (1) accepting a lower degree of correction by returning to step 550, modifying the color appearance parameters again, to a degree that approaches, but does not match the photopic color appearance parameter values, ensuring that the colors remain within the gamut of the display and valid RGB intensities are achieved; (2) clipping the negative RGB intensities to zero, or otherwise adjusting the values at step 570, to arrive at valid numbers; and (3) abandoning the correction for this particular color, and simply mapping the input image signal to the output, accepting the perceived color error in this case. If method (1) is used, and the color appearance parameter values are taken to be as close to the photopic values as physically possible, then the displayed colors will be right at the boundary of the display color gamut, or in other words, clipped at the color gamut boundary. Alternately, values for chroma (C) and colorfulness (M) can also be modified directly. Note that the examples chosen fall short of full-on single primary colors. For example, the green color shown in Table 1 has input code values of [26 204 26]; and full correction of an input such as [0 255 0] is not possible with the primaries and peak luminance given in the example.

It can be considered that the output RGB intensities step 575 effectively concludes the luminance adaptive color correction method 500, as exemplified in FIG. 7, by returning color appearance changes. The operative low luminance display correction method 250 of FIG. 3 can then continue to apply color appearance changes step 280. The determined color appearance changes can be applied to subsequent image content by a variety of calculative means, using correction values, transformative matrices, or look up tables (LUTs). The determined color appearance changes can be held constant until changing illumination or viewer conditions indicate a likely change in visual adaptation of sufficient magnitude that change color correction determination step 272 re-initiates the luminance adaptive color correction method 500. A time sequence of changes in luminance 600, visual adaptation 610, and color rendering 620 is depicted in FIGS. 8a and 8b. The changes in illumination or viewer conditions can include changes in the mesopic range from visual adaptation or changes in display brightness, or changes out of the mesopic range into the photopic range.

The change color correction determination step 272 can measure or test changes in illumination conditions, including ambient or display brightness, and changes in viewer conditions, including brightness adaptation, against various metrics. In the case of illumination conditions, absolute measures (such as measured screen lumens or ambient lumens) can be used, as well as relative measures, such as the ratio ambient to display lumens, the impact of the surround (c), or the lightness contrast factor (F_LL). In the case of testing changes in viewer conditions (detected during steps 265 and 267), parameters for chromatic adaptation, such as the degree of adaptation factor (D) can be used to model the viewer's response to a change in the color of an illuminant. The inclusion of this factor accounts for the fact that brightness adaptation is never complete at any luminance level; however in using the above equation it is implicitly assumed that the level of adaptation at a given $L_A$ has reached steady state. To estimate of model incomplete adaptation, a metric that estimates the brightness adaptation using the graph 300 of FIG. 4 (or equivalent), particularly for adaptation above the rod-cone break 315, can be used to compute a time-dependent value for $F_L$ in the CAM. For example, the illumination levels may change to new level, $L_{A2}$, from a prior value $L_{A1}$, although the time course of adaptation has not yet transpired for the viewers. A first brightness adaptation factor $F_{L1}$ can be calculated for the initial luminance condition $L_{A1}$, and a second brightness adaptation factor $F_{L2}$ can be determined for the steady state adaptation to be attained once vision has adapted to the new luminance $L_{A2}$. During the course of light level adaptation from $L_{A1}$ to $L_{A2}$, whether progressing from photopic to mesopic conditions, mesopic to photopic conditions, or between different mesopic conditions, interim adaptation factors $F_L$ can be estimated. For example, a non-linear fit to dark adaptation graph 300 can provide estimates of adaptation in values of $F_L$. For such values, an effective luminance $L_{Aeff}$ can be calculated and used for tabulating interim color correction values using luminance adaptive color correction method 500. Interim color correction values can then be used until vision adaptation is modeled or anticipated to have attained the steady state associated with the new luminance value $L_{A2}$.

As detected during step 265, the adapting field can shift through the photopic and mesopic luminance ranges with or without causing a color or spectral shift in the luminance of the adapting field. As a result, depending on the spectral or color content, chromatic adaptation, which is accounted for by the factor D, may or may not change in relation to its dependence on luminance $L_A$ or spectral content. For example, light sensors 110 can provide luminance, spectral, or color measurements of the light, as input to analysis that models chromatic adaptation in the mesopic range for different luminance levels or spectral compositions. From this, the impact on perception, including the time course of chromatic adaptation, can be accounted for using calculated intermediate values of the degree of chromatic adaptation factor D as inputs to the mesopic color correction calculations.

When change color correction determination step 272 determines color perception changes are occurring with respect to changes in the metrics that exceed defined threshold or percentage changes, then step 275 (method 500) is triggered. However, it is also noted that an alternate process can be employed, in which the luminance adaptive color correction method 500 is operated in real time, or nearly so, to derive color appearance model changes to alter content display for viewers with changing eye adaptation, such that the corrective calculations (using correction values, transformative matrices, or look up tables) are essentially changed in real time.

In summary, it can be seen that the luminance adaptive color correction method 500 provides input, calculative, and comparative analysis steps related to eye adaptation for luminance conditions that are not provided by prior art methods, such as method 400 of FIG. 6.

Image Correction

As stated previously, FIG. 3 depicts the overall low luminance display correction method 250 for color rendering of the present invention, in which during the course of image display, illumination conditions (for ambient light $D_2$ and display light $D_1$) and viewer conditions are determined by steps 265 and 267 respectively. The resulting data is analyzed to estimate the visual adaptation (step 270) of one or more viewers. The change color correction determination step 272 renders a judgment whether the current color correction is retained or a new color correction is sought. In the latter case, the visual adaptation and viewing conditions results are provided as input (step 530) for determining color appearance changes (method 500 of FIG. 7) that are appropriate for enhancing the image content for the visually adapted viewers (method 500 providing detail to step 275). The determined color attribute changes are then provided (step 570) to the image processor 140 and applied to the image content (step 280), and the corrected image content is displayed (step 260).

One or more users 10 may view the displayed image content and experience either a relatively fixed visual adaptation as the levels of ambient light 55 and display light ($\Phi_1$) remain relatively constant over time. But sudden changes in luminance can also occur, and light levels can change dramatically relative to color perception, moving between photopic and mesopic, or within the mesopic range. Thus, it is anticipated that the overall low luminance display correction method 250, and the luminance adaptive color correction method 500 can be utilized on an intermittent or periodic reoccurring basis during image display, as is suggested by FIGS. 8a and 8b. Accordingly, in FIG. 8a, the luminance 600 experiences several abrupt changes ($C_1$, $C_2$, and $C_3$) in luminance levels, where at $C_1$ and $C_3$, abrupt drops in the luminance of the adapting field occurs, and at $C_2$, an abrupt increase in luminance occurs. Correspondingly, changes in the visual adaptation 610, and particularly the brightness adaptation, occurs for a user 10. For changes $C_1$ and $C_3$, the time course visual adaptation to relative darkness in the mesopic range is gradual, above the rod-cone break 315, as shown in FIG. 4. For change $C_2$, the time course of visual adaptation to brighter condition is much faster.

Considering FIG. 4 further, it is again noted that the time course of dark adaptation occurs over several minutes. Thus, on a continuing basis, it may not be necessary to operate the luminance display correction method 250, and the supporting luminance adaptive color correction method 500, on a continuous real time basis. For example, color correction analyses can be completed, new or interim color correction values determined, and then those values can be applied for a few minutes of display time (monitored using clock 145), before the analysis is performed again to determine if new values are needed (resolved by change color correction determination step 272), and to determine them as necessary. This type of operation is exemplified in FIGS. 8a and 8b, where change events for color rendering 620 occurs in a step-wise fashion, generally accompanying the progress of visual adaptation 610.

In the case that luminance levels dimmed dramatically, and the viewers eyes are nominally following the time course of dark adaptation graph 300 into the mesopic viewing range (particularly above the rod-cone break 315), then color perception will be changing significantly. Depending on where visual adaptation settles, the low luminance display correction method 250 can provide 2-4 (new or interim) color correction changes, as the projector operates longer in the mesopic range. To avoid jarring viewers with abrupt changes, the color correction changes that are provided by method 500 and then applied at step 280 can be applied gradually over a transitional time frame. As an example, the color correction changes can be phased in over $\Delta t\sim 0.5$ min of viewing time or $\sim 900$ frames at 30 fps. Such extended transitional changes are not illustrated in FIGS. 8a,b, as the time frame is considered to be too long to fairly represent the color rendering 620 with transitional slopes. As an alternative, the color correction changes can be applied abruptly at a content scene change, assuming scene changes are either identified or detected in the streaming video content.

More generally, it will be apparent to those skilled in the art that illumination changes tracked over time, and associated changes in color appearance parameter values, can be applied to image data over an extended time, or over image sequences or video streams. Further, it may be advantageous to apply changes in color appearance parameter values in sychronization with scene changes, or in steps that coincide with successive scene changes.

Again with reference to FIG. 4, the time course of dark adaptation (graph 300) occurs over extended periods of time ($\sim 10$ mins. Duration or more), for either phase to either side of the rod-cone break 315. By comparison, the time course of light adaptation to sudden, large increases in luminance levels is an analogous and roughly inverse bi-phasic process (graph not shown) to darkness adaptation, except that it occurs much more quickly (over several seconds). Brightness adaptation to high luminance levels is an active defense mechanism designed to prevent damage to the highly sensitive visual system. Again, photopic adaptation occurs when the visual system becomes adapted to luminances $>3.4$ cd/m$^2$. Thus, if the available luminance (from ambient or display lighting) suddenly increases to photopic levels, the low luminance display correction method 250 can determine a need to color correct, and luminance adaptive color correction method 500 can quickly apply an appropriate color correction (for example, at change $C_2$). A default photopic color correction can be stored in memory 135 and applied quickly (minimal transition time) when sudden transitions to photopic conditions occur. Admittedly, in the case of an output luminance level limited portable or pico projector, the projected image may be too dim to see effectively in a suddenly photopically illuminated environment 20. However, the viewer's eyes will become photopically adapted nonetheless, and the display likely should as well.

The problem of estimating the viewer's likely visual adaptation (during step 270), using a time-dependent adaptation factor ($F_L$), an effective luminance $L_{Aeff}$ luminance factor, or other metric, is an imprecise undertaking. As users 10 come and go from the local environment 20 presently associated with the display (projector 100), the states of the current or prior light exposure and adaptations cannot be known. New viewers may be photopically, mesopically, or scotopically adapted, or combinations thereof. Moreover, the time course of dark or mesopic adaptation also depends on an individual's prior light or luminance exposure history. As an example, daytime exposure to ordinary sunlight can produce temporary but cumulative aftereffects on dark adaptation and night vision. Two or three hours of bright sunlight exposure has been shown to delay the onset of rod dark adaptation by 10 minutes or more, and to change the final threshold, so that full night vision sensitivity could not be reached for hours. Moreover, prior light exposure to hypertopic light levels (such as occur with "snow blindness") can delay changes in both cone and rod adaptation to dark conditions.

As a result, a useful approach for estimating visual adaptation as an input for determining color correction is to utilize parameters that the display or projector 100 can reasonably determined. For example, the projector 100 can determine a variety of parameters via the determine illumination conditions step 265. These include the level or luminance of ambient light 55, the level or luminance of the display light $\Phi_1$, the history of these illumination levels as experienced since the projector 100 was turned on, or the illumination level history since the current image display event began. Such illumination level results can then be provided to visual adaptation estimation step 270, and the light level magnitudes (for example in cd/m$^2$) and history can be compared to visual response for mesopic vision, including adaptation versus time (FIG. 4), to produce a time-dependent brightness adaptation factor ($F_L$). That in turn is input for determining the appropriate color corrections (step 275) provided at different times. These illumination conditions can also be measured and tracked between color correction changes, for example to enable detection of sudden changes to photopic conditions (see FIGS. 8a and 8b).

The previously mentioned light sensors 110 provide measured data for determining the illumination conditions, as needed for step 265. For example, one or more light sensors 110 can be used to detect ambient light 55, or for detecting a composite of the ambient light and display light. Preferably these sensors have a large field of view (for example +/−50 degrees), with minimal directional sensitivity. For example, these ambient light sensors can have a diffuser placed over their entrance aperture.

Preferably the light sensors 110 also include one or more sensors intended to specifically measure the screen brightness. As one approach, these light sensors 110 should collect light from a limited field of view that spans most of the image area 35, without collecting light from areas outside the image area. The goal is to acquire and track the reflected average screen luminance, rather than either peak or minimum screen luminance data from highlights or dark content. Of course, as noted previously, the distance from projector to screen, or throw 25, can vary, as thus can both the image area 35 and the luminance levels, for the same image content. Therefore, it can be useful to adapt the collected field of view of aperture for the display light sensor 110 to fall within the image area 35. As one approach, the light sensor 110 that measures the image area can include, or be part of, a camera. Assuming knowledge of the camera magnification or the throw 25, the actual size of the image area 35 can be determined, and the measured average flux can be corrected for the screen area, to determine an average luminance coming from the image area 35. A secondary sensor 115, such as a range finding or time of flight sensor can be used to measure the throw 25.

As another option, a light sensor 110 internal to the projector 100 can monitor the average projector output flux, by measuring a sample of the light that will be directed to most of the image area 35. Using this knowledge, and knowledge of the throw 25, projector magnification, or image area 35, the luminance levels present in the image area can be estimated. This approach accounts for fall-off in projector light source output over time (degradation with life). It also avoids the difficulties of collecting light from the image area 35 directly, but then also ignores display surface absorption or gain properties. Similarly or additionally, the ongoing image data can be monitored using an optional image content monitor that would determine average scene luminance, based on average code values or bit levels present in the screen content, and potentially track them over time. However, without further data, this approach is even further removed from accounting for actual display surface properties or projector performance variations.

In this discussion, it is assumed that the viewer is generally looking at the image area 35, and the ambient light level then largely defines light exposure for the surround or peripheral to image area field of view. The image area 35 will be composed of various color elements as defined above, surrounded by a proximal field and background, also as defined above. The proximal field and background are the immediate area surrounding each color element, and are assumed to be the same color for our purposes, and are taken to be 20% of the peak display white luminance (the good old ~18% gray world assumption). The surround, as defined above, is the total field around the color element, and may include some image area and some ambient, depending on the size of image area 35—remember that the background extends out to 10 degrees subtense from the center of the visual field. The adapting field, as defined above, is going to be an average over the whole visible field, including image area and ambient. The luminance of the adapting field $L_A$ can be estimated by, for example, an equation of the following type:

$$L_A = 0.2 \cdot L_W \frac{A_I}{A_T} + L_{amb} \frac{A_{amb}}{A_T}$$

Where $L_w$ is the peak display luminance, $L_{amb}$ is the luminance of the ambient, $A_I$ is the area occupied by the image, $A_{amb}$ is the area occupied by the ambient, and $A_T$ is the total area occupied by the adapting field. Note that the area terms may be expressed either as an area or a subtended solid angle, as long as they are consistent.

The problem of estimating the viewer's likely visual adaptation can be approached other ways. As shown in FIG. 4, the low luminance display correction method 250 includes a determine viewer conditions step 267. In this step, which is optional, the presence of one or more viewers in the local environment of the projector 100 can be determined and tracked. For example, one or more secondary sensors 115, such as a proximity sensor, a motion sensor, a electro-magnetic bio-field detecting sensor, or combinations thereof, can be used to monitor the presence or location of viewers within the local environment 20 proximate to the projector 100. If the viewers are assumed to be entering the local environment 20 with photopic eye adaptation, then color correction could follow (using luminance adaptive color correction method 500) a time sequence of change appropriate for enhancing viewing through to the current low luminance (mesopic) viewing conditions. Thereafter, the low luminance display correction method 250 could continue to determine color corrections as necessary as illumination conditions change to higher or lower luminance values. However, as previously stated, the assumptions of immediately prior photopic exposure and standard low luminance visual adaptation is questionable. Certainly, prior luminance exposure history of the viewers can be determined other ways, including using distributed sensors, sensors worn by the viewers or companions, or via direct user input of recent light exposure from the users themselves.

As previously discussed, the low luminance display correction method 250 and luminance adaptive color correction method 500 of the present invention have been described as operable for image correction between photopic and mesopic viewing conditions. However, it should be understood that these methods can be extended into scotopic viewing conditions, for the benefit of scotopically adapted people. It is generally considered that scotopically adapted people do not perceive color at all, however as an example, a scotopically adapted person can see a red tail light of a car as red without losing their scotopic adaptation. Certainly, their color perception is limited. As one approach, the display or projector 100 can recognize that it is being operated under scotopic viewing conditions, and render the image content in gray scale, potentially providing a comparable range of grey scale code values in all colors. As a result, red and green image content would be more perceptible, relative to blue, than it otherwise would have been, although color content would have been lost. As another example, the display or projector 100 can render image content colors that are nearly saturated as fully saturated using the appropriate code values, while rendering less saturated colors, such as pastels, into grey scale image content, such as described above. The resulting image would be grey scale with selective color highlights. Similar selective color rendering can be provided for the benefit of color blind or partially color blind people, assuming the display can process input indicative that viewers have such problems.

It will be apparent to those skilled in the art that this method can also be applied to display devices other than just projectors 100 (either front or rear projection), including direct view self-emissive electronic displays, such as CRTs, liquid crystal displays (LCDs), light emitting diode (LED) or OLED (organic LED) displays, or plasma displays, which are deliberately operated in low luminance output conditions in dim environments. The method of the present invention is also applicable to trans-reflective or reflective displays that use ambient light 55 as a display light source. It should also be understood that the methods of the present invention can be used for display devices operable for a wide variety of applications, including portable entertainment or personal communications viewing (such as with a pico-projector, a camera, or cell phone type device), or for fixed viewing (as in a home theatre). These methods can also be extended to other dim viewing situations, including surveillance or security applications, and navigational situations in night-time conditions, in which displays must be dim enough to maintain dark or dim visual adaptation for purposes of seeing out of the vehicle, including automotive, aviation and maritime navigation.

Additionally, it will be apparent to those skilled in the art of digital image processing that the computations required by the inventive method outlined in FIGS. 3 and 7 can be executed in real time or through the use of lookup tables (LUTs). That is, for real time execution, the input RGB code values are input to input image signal step 505 at the time they are needed, all subsequent steps are performed, and the resulting output image signals sent via step 575. All computations can be performed in software, on programmable computing hardware, or dedicated hardware can be manufactured for any or all steps in the process to enhance the speed of the process. Alternatively, all possible input code values can be input in advance to step 505 in FIG. 7, for one or more sets of enumerated viewing environment conditions, and the corresponding output image signals derived at step 575, and stored in a LUT for future access, eliminating the need for real time processing. The advantage is the elimination of the time needed to complete the calculations, and therefore a faster response of the display to changing conditions. The specific conditions under which the output image signals will be pre-computed and stored can be enumerated for a given display. For example, a display can have peak luminance settings of 10 cd/m², 5 cd/m², and 1 cd/m², and 10 viewer adaptation settings, the latter dependent on combinations of detected ambient and display luminance and time spent at that luminance. In this case, a total of 30 LUTs would need to be pre-computed and saved for application at the time of display correction. It will be apparent to those skilled in the art that the precomputed modifications to color appearance parameter values can also be stored as other tables of correction values, or transformative matrices.

The invention has been described in detail with particular reference to certain preferred embodiments thereof, but it will be understood that variations and modifications can be effected within the scope of the invention. It is emphasized that the apparatus or methods described herein can be embodied in a number of different types of systems, using a wide variety of types of supporting hardware and software. It should also be noted that drawings are not drawn to scale, but are illustrative of key components and principles used in these embodiments.

PARTS LIST 10 user
20 environment
25 throw
30 display surface
35 image area
40 image pixel
50 field of view
55 ambient light ($\phi_2$)
100 projector
105 lens
110 light sensor
115 secondary sensor
130 computer
135 memory
140 image processor
145 clock
200 display system
250 low luminance display correction method
260 display image content step
265 determine illumination conditions step
267 determine viewer conditions step
270 estimate visual adaptation step
272 change color correction determination step
275 determine color appearance changes step
280 apply color appearance changes step
300 dark adaptation graph
310 brightness adaptation curve for normal eye
315 rod-cone break
320 brightness adaptation curve for color-blind person
325 brightness adaptation curve for night-blind person
330 cone sensitivity
350 spectral luminous efficacy graph
360 scotopic response
365 mesopic response
370 photopic response
400 method for adapting a display (prior art)
405 image signal input step
410 compute RGB intensities step
415 modify color saturation step
420 modify color hue step
425 compute photopic XYZ values step
430 evaluate reproduced colors step
435 error evaluation step
440 output image signals step
500 luminance adaptive color correction method
505 image signal input step
510 compute RGB intensities step
525 compute photopic XYZ values step
530 receive viewing environment data
540 photopic CAM analysis step
545 mesopic CAM analysis step
550 modify mesopic color appearance parameters step
560 inverse CAM analysis step
565 re-compute RGB intensities step
570 test RGB intensities step
575 output RGB intensities step
600 luminance
610 visual adaptation
620 color rendering

The invention claimed is:

1. A method comprising:
  determining, by a processor, an initial ambient light value and a subsequent ambient light value based at least in part on detected ambient light conditions;
  determining, by the processor, an initial displayed image brightness value and a subsequent displayed image brightness value based at least in part on detected displayed image brightness;
  determining, by the processor, initial luminance conditions in an adaptive field based at least in part on the initial ambient light value and the initial displayed image brightness value;
  determining, by the processor, subsequent luminance conditions in the adaptive field based at least in part on the subsequent ambient light value and the subsequent displayed image brightness value;
  tracking, by the processor, a luminance condition history of the adaptive field;
  determining, by the processor, that the luminance conditions have changed to or from low luminance conditions corresponding to human mesopic vision based at least in part on a comparison of the initial luminance conditions and the subsequent luminance conditions;
  determining, by the processor, changes in color appearance parameter values to be applied to displayed images based at least in part on the initial luminance conditions, the subsequent luminance conditions, current color appearance parameter values, the luminance condition history, and a color appearance model of human vision that encompasses at least photopic and mesopic viewing conditions, wherein the color appearance parameter values relate to a plurality of attributes of color perception by a human; and
  applying, by the processor, the changes in the color appearance parameter values to image data by altering the image data for the displayed images.

2. The method as in claim 1, wherein the determining the changes in the color appearance parameter values comprise:
  computing photopic color appearance parameter values and mesopic color appearance parameter values for each pixel location using the color appearance model; and
  determining changes in the mesopic color appearance parameter values for each pixel location by selectively modifying the mesopic color appearance parameter values to approach or match the photopic color appearance parameter values for each pixel location.

3. The method as in claim 2, wherein the selectively modifying the mesopic color appearance parameter values includes substituting the mesopic color appearance parameter values for the photopic color appearance parameter values.

4. The method as in claim 1, wherein the determining the changes in the color appearance parameter values comprise:
receiving an input image signal for each of a plurality of image pixel locations;
computing input red, green, and blue image intensities for each pixel location based at least in part on the input image signal;
computing input X, Y, and Z tristimulus values for each pixel location based at least in part on the input red, green, and blue image intensities;
computing photopic color appearance parameter values and mesopic color appearance parameter values for each pixel location based at least in part on the color appearance model and the input X, Y, and Z tristimulus values;
determining modified mesopic color appearance parameter values for each pixel location by selectively modifying the mesopic color appearance parameter values to use either the corresponding photopic color appearance parameter values or intermediate color appearance parameter values between the mesopic condition color appearance parameter values and the photopic condition color appearance parameter values;
computing output X, Y, and Z tristimulus values for each pixel location based at least in part on an inverse color appearance model and the modified mesopic color appearance parameter values;
computing output red, green, and blue image intensities for each pixel location based at least in part on the output X, Y, and Z tristimulus values; and
sending the output red, green, and blue image intensities for each pixel location to the display.

5. The method as in claim 4, further comprising modifying the modified mesopic color appearance parameter values in response to a determination that at least one of the output red, green, and blue image intensities for a pixel location is invalid.

6. The method as in claim 5, wherein the modifying the modified mesopic color appearance parameter values comprises modifying the mesopic color appearance parameter values to a lower degree of correction.

7. The method as in claim 5, wherein the modifying the modified mesopic color appearance parameter values comprises reducing the modification of the modified mesopic color appearance parameter values to a point that produces non-negative output red, green, and blue image intensities.

8. The method as in claim 5, wherein the modifying the modified mesopic color appearance parameter values comprises modifying the modified mesopic color appearance parameter values to be the mesopic color appearance parameter values.

9. The method as in claim 4, wherein the photopic color appearance parameter values relate to color perception of the images by a human in photopic luminance conditions, and the mesopic color appearance parameter values relate to color perception of the images by the human in mesopic luminance conditions.

10. The method as in claim 1, wherein the changes in the color appearance parameter values are determined relative to parameters including lightness, chroma, hue angle, brightness, saturation, or colorfulness.

11. The method as in claim 1, wherein the changes in the color appearance parameter values are determined based at least in part on scotopic conditions using a color appearance model of human vision extensible to scotopic conditions, wherein images are selectively modified for scotopic viewing by applying the changes in the color appearance parameter values, and wherein applying the changes in the color appearance parameter values includes modifying the image data to be grey scale or saturated color values.

12. The method as in claim 1, further comprising tracking, by the processor, a plurality of subsequent luminance conditions, color appearance parameter values, and changes in color appearance parameter values.

13. The method as in claim 1, wherein the changes in the color appearance parameter values are determined on an ongoing basis in accordance with changes in subsequent luminance conditions or estimates of current viewer adaptation.

14. The method as in claim 1, wherein the color appearance model provides for the temporal response of human visual adaptation to increase or decrease in brightness, and wherein a temporal course of visual adaptation is analyzed using a time-dependent adaptation or luminance factor.

15. The method as in claim 1, wherein the application of the changes in the color appearance parameter values are applied to the image data over time or an image sequence.

16. The method as in claim 1, wherein the application of the changes in the color appearance parameter values are applied to the image data at scene changes in an image sequence.

17. The method as in claim 1, wherein the changes in the color appearance parameter values are applied to the image data using correction values, transformative matrices, or look up tables (LUTs), the method further comprising storing, in memory, the correction values, transformative matrices, or look up tables (LUTs) that have been computed in advance for a set of one or more viewing conditions.

18. The method as in claim 1, wherein the adapting field comprises a field of vision of a viewer.

19. The method as in claim 1, wherein the changes in the color appearance parameter values are determined relative to parameters including lightness, chroma, hue angle, brightness, saturation, and colorfulness.

20. The method as in claim 1, further comprising displaying, by a display, images on a display surface using the color appearance parameter values.

21. The method as in claim 1, further comprising:
detecting, by a first light sensor, initial ambient light conditions and subsequent ambient light conditions; and
detecting, by a second light sensor, initial displayed image brightness and subsequent displayed image brightness.

22. The method of claim 1, wherein the tracking the luminance condition history commences in response to a display device being powered on.

23. The method of claim 1, further comprising estimating, by the processor, a luminance level of a screen configured to reflect projected light comprising the displayed images based at least in part on a measured sample of the projected light.

24. The method of claim 23, wherein the estimating is further based at least in part on a travel distance of the projected light, a magnification level of a projector, or a size of an area of the projected light.

25. The method of claim 1, further comprising:
determining, by the processor, that a viewer is proximate to the displayed image; and
estimating, by the processor, the viewer's visual adaptation based at least in part on the determination that the viewer is proximate to the displayed image and the luminance condition history.

26. The method of claim 1, further comprising:
determining, by the processor, luminance conditions in a plurality of locations; and estimating, by the processor, a viewer's visual adaptation based at least in part on the luminance conditions of the plurality of locations and a viewer's proximity to the plurality of locations.

27. The method of claim 26, wherein at least a portion of the plurality of locations are in different rooms.

28. The method of claim 1, further comprising estimating, by the processor, a viewer's visual adaptation based at least in part on measured luminance conditions of the viewer.

29. The method of claim 1, wherein the determining the changes in color appearance parameter values is further based at least in part on a chromatic adaptation model of human vision.

30. A method comprising:
determining, by a processor, an ambient light value;
determining, by the processor, a displayed image brightness value;
tracking, by the processor, a luminance condition history;
determining, by the processor, low luminance conditions based at least in part on the ambient light value and the displayed image brightness value;
determining, by the processor, changes in color appearance to be applied to displayed images based at least in part on the determined low luminance conditions, the luminance condition history, and a color appearance model of human vision that encompasses at least photopic and mesopic viewing conditions, wherein the color appearance relates to color perception by a human; and
applying, by the processor, the changes in the color appearance to image data by altering the image data for the displayed images.

31. The method as in claim 30, wherein the determining the changes in the color appearance comprise:
computing photopic color appearance parameter values and mesopic color appearance parameter values for each pixel location using the color appearance model; and
determining changes in the mesopic color appearance parameter values for each pixel location by selectively modifying the mesopic color appearance parameter values to approach or match the photopic color appearance parameter values for each pixel location.

32. The method as in claim 31, wherein the selectively modifying the mesopic color appearance parameter values includes substituting mesopic color appearance parameter values with photopic color appearance parameter values.

33. The method as in claim 30, wherein the determining the changes in the color appearance comprises:
receiving an input image signal for each of a plurality of image pixel locations;
computing input red, green, and blue image intensities for each pixel location;
computing input X, Y, and Z tristimulus values for each pixel location;
computing photopic color appearance parameter values and mesopic color appearance parameter values for each pixel location using the low luminance conditions and a color appearance model;
selectively modifying the mesopic color appearance parameter values for each pixel location to use the corresponding photopic color appearance parameter values or intermediate color appearance parameter values between the mesopic color appearance parameter values and the photopic color appearance parameter values;
computing output X, Y, and Z tristimulus values for each pixel location using an inverse color appearance model and the modified photopic color appearance parameter values and mesopic color appearance parameter values;
computing output red, green, and blue image intensities for each pixel location;
modifying the mesopic color appearance parameter values for each pixel location to correct the output red, green, and blue image intensities based at least in part on the output red, green, and blue image intensities; and
sending the output red, green, and blue image intensities for each pixel location to the display.

34. The method as in claim 30, wherein the changes in the color appearance are determined relative to parameters including lightness, chroma, hue angle, brightness, saturation, or colorfulness.

35. The method as in claim 30, further comprising correcting the changes in color appearance with respect to human brightness adaptation, human chromatic adaptation, or both.

36. A method comprising:
determining, by a processor, ambient light values over time;
determining, by the processor, displayed image brightness values over time;
tracking, by the processor, a luminance condition history over time;
determining, by the processor, initial luminance conditions in an adaptive field based at least in part on the ambient light values and the displayed image brightness values;
determining, by the processor, when luminance conditions become low luminance conditions corresponding to human mesopic vision;
determining, by the processor, changes in color appearance to be applied to displayed images based at least in part on initial luminance conditions, the low luminance conditions, the luminance condition history, and a color appearance model of human vision that encompasses at least photopic and mesopic viewing conditions, wherein the color appearance relates to color perception by a human; and
applying, by the processor, the changes in color appearance to image data by altering the image data for the displayed images.

37. The method as in claim 36, wherein the determining the changes in the color appearance comprises:
computing photopic color appearance parameter values and mesopic color appearance parameter values for each pixel location using a color appearance model; and
determining changes in the mesopic color appearance parameter values for each pixel location by selectively modifying the mesopic color appearance parameter values to approach or match the photopic color appearance parameter values for each pixel location.

38. The method as in claim 37, wherein the selectively modifying the mesopic color appearance parameter values includes substituting mesopic color appearance parameter values with photopic color appearance parameter values.

39. The method as in claim 36, wherein the changes in the color appearance are determined relative to parameters including lightness, chroma, hue angle, brightness, saturation, or colorfulness.

40. The method as in claim 36, wherein the presence, location, or number of viewers in a local environment of the display surface is monitored, and wherein the viewers are sensed using one or more sensors including a proximity sensor, a motion sensor, or an electro-magnetic bio-field detecting sensor.

41. A system comprising:
one or more sensors configured to detect environmental data including ambient light conditions and displayed image brightness;

a processor configured to alter image data of the displayed images; and a non-transitory computer-readable medium including computer-readable instructions that, upon execution by the processor, cause the processor to:

determine an ambient light value and a displayed image brightness value based at least in part on the ambient light conditions and the displayed image brightness;

determine luminance conditions in the environment based at least in part on the ambient light value and the displayed image brightness value;

track the luminance conditions to compile a luminance condition history;

compute color appearance parameter values based at least in part on a color appearance model of human vision that encompasses at least photopic and mesopic viewing conditions, wherein the color appearance parameter values relate to a plurality of attributes of color perception by a human; and determine changes in the color appearance parameter values based at least in part on the color appearance model, the luminance condition history, and changes in luminance conditions.

42. The system according to claim 41, wherein the sensors are configured to collect the environmental data over time; and wherein the computer-readable instructions further cause the processor to modify the color appearance parameter values on an ongoing basis based at least in part on the environmental data and a temporal model of human visual adaptation.

43. A non-transitory computer-readable medium including computer-readable instructions that, upon execution by a processor, cause a device to:

determine an ambient light value;

determine a displayed image brightness value;

determine low luminance conditions based at least in part on the ambient light value and the displayed image brightness value;

track luminance conditions to compile a luminance condition history;

determine changes in color appearance to be applied to displayed images based at least in part on the determined low luminance conditions, the luminance condition history, and a color appearance model of human vision that encompasses at least photopic and mesopic viewing conditions, wherein the color appearance relates to color perception by a human; and apply the changes in the color appearance to image data by altering the image data for the displayed images.

* * * * *